United States Patent
Zhang et al.

(10) Patent No.: US 11,569,949 B2
(45) Date of Patent: Jan. 31, 2023

(54) COMMUNICATION METHOD AND COMMUNICATIONS APPARATUS

(71) Applicant: HUAWEI TECHNOLOGIES CO., LTD., Guangdong (CN)

(72) Inventors: Di Zhang, Beijing (CN); Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 17/100,444

(22) Filed: Nov. 20, 2020

(65) Prior Publication Data
US 2021/0091900 A1 Mar. 25, 2021

Related U.S. Application Data

(63) Continuation of application No. PCT/CN2019/087929, filed on May 22, 2019.

(30) Foreign Application Priority Data

May 22, 2018 (CN) .......................... 201810496966.7

(51) Int. Cl.
| | |
|---|---|
| *H04L 5/00* | (2006.01) |
| *H04W 72/04* | (2009.01) |
| *H04W 56/00* | (2009.01) |

(52) U.S. Cl.
CPC .......... *H04L 5/0023* (2013.01); *H04L 5/0092* (2013.01); *H04W 56/001* (2013.01); *H04W 72/042* (2013.01); *H04W 72/0453* (2013.01)

(58) Field of Classification Search
None
See application file for complete search history.

(56) References Cited

U.S. PATENT DOCUMENTS

2018/0048413 A1 2/2018 Liu et al.
2018/0331727 A1* 11/2018 John Wilson ........ H04B 7/0408
(Continued)

FOREIGN PATENT DOCUMENTS

| CN | 108024365 A | 5/2018 |
|---|---|---|
| CN | 109474967 B | 11/2019 |

(Continued)

OTHER PUBLICATIONS

CATT, "On BWP operation," 3GPP TSG RAN WG1 Meeting #93, R1-1806300, Busan, Korea, May 21-25, 2018, 3 pages.
(Continued)

*Primary Examiner* — Saba Tsegaye
(74) *Attorney, Agent, or Firm* — Fish & Richardson P.C.

(57) ABSTRACT

The present disclosure relates to communication methods. One example method includes determining a first bandwidth part (BWP) and a second BWP, determining an association relationship between the first BWP and the second BWP, and at least one of determining a first quasi co-location (QCL) relationship based on the association relationship, and receiving a physical downlink shared channel (PDSCH) in the second BWP based on the first QCL relationship, or determining a second QCL relationship based on the association relationship, and receiving a physical downlink control channel (PDCCH) in the second BWP based on the second QCL relationship.

20 Claims, 10 Drawing Sheets

(56) References Cited

U.S. PATENT DOCUMENTS

| | | | |
|---|---|---|---|
| 2019/0261244 A1* | 8/2019 | Jung | H04L 5/0053 |
| 2019/0296956 A1* | 9/2019 | John Wilson | H04W 28/20 |
| 2019/0364556 A1* | 11/2019 | Davydov | H04B 7/0695 |

FOREIGN PATENT DOCUMENTS

| | | |
|---|---|---|
| CN | 108112080 B | 5/2021 |
| EP | 3769564 A1 | 1/2021 |
| WO | 2019182806 A1 | 9/2019 |

OTHER PUBLICATIONS

Extended European Search Report issued in European Application No. 19808324.8 dated May 25, 2021, 14 pages.

Panasonic, "QCL related issues during BWP switching," 3GPP TSG-RAN WG1 Meeting #93, R1-1806390, Busan, Korea, May 21-25, 2018, 3 pages.

Qualcomm Incorporated, "Beam managementfor NR," 3GPP TSG-RAN WG1 Meeting 93, R1-1807341, Busan, Korea, May 21-25, 2018, 11 pages.

Qualcomm Incorporated, "Remaining Issues on BWP," 3GPP TSG RAN WG1 Meeting #93, R1-1807368, Busan, Korea, May 21-25, 2018, 19 pages.

Qualcomm Incorporated, "Remaining Details on QCL," 3GPP TSG RAN WG1 Meeting #93, R1-1807398, Busan, Korea, May 21-25, 2018, 10 pages.

Office Action issued in Indian Application No. 202047052506 dated Dec. 27, 2021, 8 pages.

3GPP TS 38.212 V15.1.1 (Apr. 2018), "3rd Generation Partnership Project;Technical Specification Group Radio Access Network;NR;Multiplexing and channel coding(Release 15)," Apr. 2018, 94 pages.

3GPP TS 38.214 V15.1.0 (Mar. 2018), "3rd Generation Partnership Project;Technical Specification Group Radio Access Network;NR;Physical layer procedures for data (Release 15)," Mar. 2018, 77 pages.

3GPP TS 38.321 V15.1.0 (Mar. 2018), "3rd Generation Partnership Project;Technical Specification Group Radio Access Network;NR;Medium Access Control (MAC) protocol specification(Release 15)," Mar. 2018, 67 pages.

3GPP TS 38.331 V15.1.0 (Mar. 2018), "3rd Generation Partnership Project;Technical Specification Group Radio Access Network;NR-;Radio Resource Control (RRC) protocol specification(Release 15)," Mar. 2018, 268 pages.

PCT International Search Report and Written Opinion issued in International Application No. PCT/CN2019/087929 dated Aug. 22, 2019, 14 pages (with English translation).

Qualcomm Incorporated, "Beam management for NR," 3GPP TSG-RAN WG1 Meeting 92bis, R1-1804787, Sanya, China, Apr. 16-20, 2018, 8 pages.

Qualcomm Incorporated, "Remaining Details on QCL," 3GPP TSG RAN WG1 Meeting #92bis, R1-1804796, Sanya, China, Apr. 16-20, 2018, 10 pages.

Qualcomm Incorporated, "Remaining Issues on BWP", 3GPP TSG RAN WG1 Meeting #92bis, R1-1804809, Sanya, China, Apr. 16-20, 2018, 18 pages.

Office Action issued in Chinese Application No. 201810496966.7 dated Oct. 10, 2022, 12 pages.

Vivo, "Remaining Issues on Beam Measurement and Reporting," 3GPP TSG RAN WG1 Meeting #92, R1-1801520, Athens, Greece, Feb. 26-Mar. 2, 2018, 7 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2019/087929, filed on May 22, 2019, which claims priority to Chinese Patent Application No. 201810496966.7, filed on May 22, 2018. The disclosures of the aforementioned applications are hereby incorporated by reference in their entireties.

TECHNICAL FIELD

This application relates to a communications system, and more specifically, to a communication method and a communications apparatus.

BACKGROUND

Dynamic switching of a bandwidth part (bandwidth part, BWP) is supported in a current standard. BWP switching may be performed on a same carrier or between different carriers. How a terminal receives, after the terminal switches from a BWP to another BWP, physical downlink control information (physical downlink control channel, PDCCH) and a physical downlink shared channel (physical downlink share channel, PDSCH) in the BWP that is after the switching is not involved in the prior art.

SUMMARY

This application provides a communication method, to transmit a PDCCH and/or a PDSCH based on an association relationship between a first BWP and a second BWP.

According to a first aspect, a communication method is provided. The method includes: determining a first BWP and a second BWP; determining an association relationship between the first BWP and the second BWP; and determining a first quasi co-location (quasi-co-location, QCL) relationship based on the association relationship, and receiving a PDSCH in the second BWP based on the first QCL relationship; and/or determining a second QCL relationship based on the association relationship, and receiving a PDCCH in the second BWP based on the second QCL relationship.

The first QCL relationship may be specific QCL information or indicated by using the QCL information. The QCL information may be configured by a network device for a terminal by using signaling, or a terminal may assume, based on a preset condition, that some parameters of the second BWP and some parameters of the first BWP are QCL or have some association relationships. For example, the network device may indicate a transmission configuration indicator (transmission configuration indicator, TCI) state of the PDSCH or the PDCCH by using signaling. The TCI state is used to indicate that a demodulation reference signal (demodulation reference signal, DMRS) for the PDSCH or the PDCCH and a reference signal included in the TCI state satisfy a QCL relationship. Alternatively, it may be assumed in a predefined manner that a DMRS for the PDSCH or the PDCCH and a reference signal (for example, a synchronization signal/physical broadcast channel block (synchronization signal/PBCH block, SSB)) satisfy a (spatial) QCL relationship. For the second QCL relationship, refer to the description of the first QCL relationship. Further, the first QCL relationship may be the same as the second QCL relationship. However, this is not limited in this application.

According to the communication method in this embodiment of this application, the first QCL relationship and/or the second QCL relationship can be determined based on the association relationship between the first BWP and the second BWP, so that the PDCCH and/or the PDSCH can be transmitted based on the first QCL relationship and/or the second QCL relationship.

With reference to the first aspect, in a possible implementation, the determining a first BWP and a second BWP includes: receiving BWP switching indication information; and switching from the first BWP to the second BWP based on the BWP switching indication information.

In other words, the first BWP is before the switching, and the second BWP is after the switching. In this way, according to the communication method in this embodiment of this application, the PDCCH and/or the PDSCH may be received, based on the association relationship between the BWP before the switching and the BWP after the switching, in the BWP that is after the switching.

The first BWP and the second BWP may be on one carrier, or may be on a plurality of carriers. For example, the first BWP may be configured on a carrier #1, and the second BWP may be configured on a carrier #2. The carrier #1 and the carrier #2 may be two carriers on which carrier aggregation is performed.

It should be understood that a "BWP" in this application may be replaced with a "carrier". The carrier may also be referred to as a component carrier (Component Carrier, CC)

In addition, the terminal may access a plurality of carriers, and one BWP may be configured for each carrier. To be specific, there may be a plurality of active BWPs. The first BWP may be a BWP for which QCL information has been configured and that is in the plurality of active BWPs, and the second BWP may be a BWP for which no QCL information has been configured and that is in the plurality of active BWPs. In this way, according to the method in this embodiment of this application, the PDCCH and/or the PDSCH may be received in the second BWP based on the association relationship between the first BWP and the second BWP before the QCL information is configured for the second BWP.

With reference to the first aspect, in a possible implementation, the first QCL relationship and the second QCL relationship may be indicated by using QCL information configured by the network device for the first BWP.

Further, the terminal may receive the PDSCH based on the first QCL relationship and/or receive the PDCCH based on the second QCL relationship in the following case: before the terminal receives QCL information of a control-resource set (CORESET) and/or the PDSCH in the second BWP.

Therefore, according to the communication method in this embodiment of this application, the terminal and the network device may transmit the PDCCH and/or the PDSCH in the second BWP by reusing QCL information of the first BWP and with no need to configure the QCL information after the network device performs beam training, so that a delay problem caused by the beam training can be alleviated. In addition, the network device and the terminal device can align QCL assumptions or beams (a transmit beam and a receive beam) by reusing the QCL information of the first BWP, so that the terminal can accurately receive data, and signaling overheads required for configuring the QCL information by the network device for the second BWP can be reduced.

With reference to the first aspect, in a possible implementation, the association relationship between the first BWP and the second BWP includes at least one of the following cases:

the first BWP and the second BWP partially or completely overlap in frequency domain;

a reference signal configured for the first BWP and a reference signal configured for the second BWP satisfy a QCL relationship;

the first BWP and the second BWP include the same control-resource set; and the first BWP and the second BWP are intra-band BWPs (intra-band BWP).

Specifically, that the first BWP and the second BWP overlap in frequency domain may alternatively be understood as that the first BWP and the second BWP include a same resource block (resource block, RB). That the first BWP and the second BWP overlap in frequency domain may be any one of the following: A: The first BWP and the second BWP partially overlap in frequency domain, and there is no inclusion relationship between the first BWP and the second BWP. To be specific, the first BWP and the second BWP include the same RB, but the first BWP is not a subset of the second BWP, and the second BWP is also not a subset of the first BWP. B: The first BWP is a proper subset of the second BWP. To be specific, the second BWP includes all RBs included in the first BWP, and at least one of all RBs included in the second BWP is different from the RBs included in the first BWP. C: The second BWP is a proper subset of the first BWP. To be specific, the first BWP includes all RBs included in the second BWP, and at least one of all RBs included in the first BWP is different from the RBs included in the second BWP. D: The second BWP and the first BWP completely overlap. To be specific, RBs included in the second BWP and the first BWP are the same. In this case, some parameters of the first BWP and the second BWP may be different. For example, subcarrier spacings of the first BWP and the second BWP may be different, and CORESETs configured for the first BWP and the second BWP may be different.

The first BWP and the second BWP include the same control-resource set (control resource set, CORESET). To be specific, the first BWP and the second BWP overlap in frequency domain, and at least one CORESET configured by the network device in an overlapping area that is of the first BWP and the second BWP and that is in the first BWP is partially or completely the same as at least one CORESET configured by the device in an overlapping area that is of the first BWP and the second BWP and that is in the second BWP.

The reference signal configured by the network device for the first BWP and the reference signal configured by the network device for the second BWP satisfy the QCL relationship. Specifically, a reference signal indicated by using QCL information configured by the network device for a CORESET and/or a PDSCH included in the first BWP includes a reference signal of the second BWP. Alternatively, a reference signal indicated by using QCL information configured by the network device for a reference signal included in the first BWP is a reference signal of the second BWP. For example, if a TCI state configured by the network device for a CORESET #1 in the first BWP includes a reference signal CSI-RS #1, and the CSI-RS #1 is the reference signal of the second BWP, it is considered that there is the association relationship between the first BWP and the second BWP. Alternatively, a reference signal indicated by using QCL information configured by the network device for a CORESET and/or a PDSCH included in the second BWP includes a reference signal of the first BWP. Alternatively, a reference signal indicated by using QCL information configured by the network device for a reference signal included in the second BWP is a reference signal of the first BWP. For example, if a TCI state configured by the network device for a CORESET #2 in the second BWP includes a reference signal CSI-RS #2, and the CSI-RS #2 is the reference signal of the first BWP, it is considered that there is the association relationship between the first BWP and the second BWP.

With reference to the first aspect, in a possible implementation, the determining a first QCL relationship based on the association relationship includes:

the first QCL relationship is indicated by using QCL information included in downlink control information (downlink control information, DCI), and the DCI further includes BWP switching indication information.

It should be understood that the DCI is located in the first BWP. In other words, the QCL information included in the DCI that is located in the first BWP and that is used to indicate BWP switching is the first QCL relationship.

Optionally, the QCL information included in the DCI may be one piece of candidate QCL information configured for the first BWP. In this way, the terminal and the network device may transmit the PDCCH and/or the PDSCH in the second BWP by reusing QCL information of the first BWP and with no need to configure the QCL information after the network device performs beam training, so that a delay problem caused by the beam training can be alleviated. In addition, the network device and the terminal device can align QCL assumptions or beams (a transmit beam and a receive beam) by reusing the QCL information of the first BWP, so that the terminal can accurately receive data, and signaling overheads required for configuring the QCL information by the network device for the second BWP can be reduced.

It should be understood that the DCI may alternatively be one piece of candidate QCL information configured for the second BWP. This is not limited in this application.

Further, when a scheduling offset is greater than or equal to a first threshold, the first QCL relationship may be QCL information included in DCI used to indicate BWP switching.

In this application, the scheduling offset is a time offset between the downlink DCI and the PDSCH.

For example, the first threshold may be reported by the terminal based on a capability of the terminal, may be configured by the network device, or may be predefined. In a case of cross-BWP scheduling, for example, when DCI in the first BWP is used to schedule a PDSCH in the second BWP, the first threshold is a sum of time required for beam switching and the BWP switching. In a case of scheduling in a same BWP, for example, when DCI in the second BWP is used to schedule a PDSCH in the second BWP, the first threshold is a time required for beam switching.

With reference to the first aspect, in a possible implementation, the determining a first QCL relationship and/or a second QCL relationship based on the association relationship includes:

the first QCL relationship and/or the second QCL relationship are/is indicated by using default QCL information, and the default QCL information is at least one of the following:

QCL information of a control-resource set with a smallest index or identifier in control-resource sets included in the first BWP or the second BWP;

QCL information of a control-resource set included in both the first BWP and the second BWP;

QCL information of a control-resource set included in the first BWP in a frequency domain resource on which the first BWP and the second BWP overlap;

third QCL information in QCL information configured for a control-resource set and/or a PDSCH in the first BWP, where a reference signal indicated by using the third QCL information is located in the second BWP; and fourth QCL information in QCL information configured for a control-resource set and/or a PDSCH in the second BWP, where a reference signal indicated by using the fourth QCL information is located in the first BWP.

Optionally, a control-resource set included in the first BWP or the second BWP may be a CORESET for which valid QCL information is configured, namely, a CORESET for which QCL information is configured and that is in all the control-resource sets included in the first BWP or the second BWP.

Optionally, a control-resource set included in the first BWP or the second BWP may be a CORESET with a smallest identifier value or index value in control-resource sets used for broadcast PDCCH sending or a CORESET with a smallest identifier value or index value in control-resource sets used for non-broadcast PDCCH sending.

With reference to the first aspect, in a possible implementation, the determining a first QCL relationship based on the association relationship includes:

the first QCL relationship is indicated by using default QCL information, and the default QCL information is QCL information of a control-resource set on which DCI for scheduling the PDSCH is located.

In other words, if DCI #1 in the first BWP schedules the PDSCH in the second BWP, QCL information of a CORESET on which the DCI #1 is located may be used as the first QCL relationship.

With reference to the first aspect, in a possible implementation, the determining a first QCL relationship based on the association relationship and/or the determining a second QCL relationship based on the association relationship include/includes:

the first QCL relationship and/or the second QCL relationship are/is indicated by using default QCL information, and the default QCL information is at least one of the following:

one of pieces of QCL information configured for a control-resource set and/or a PDSCH in the second BWP;

QCL information of a synchronization signal/physical broadcast channel block SSB used for initial access;

QCL information used to receive a broadcast PDCCH; and

QCL information of an SSB with a smallest index in SSBs included in the second BWP.

Further, if the second BWP is an initial BWP or includes an initial BWP, or if the second BWP does not include an SSB, the first QCL relationship and/or the second QCL relationship are/is indicated by using the QCL information of the SSB used for the initial access or the QCL information used to receive the broadcast PDCCH; and/or if the second BWP does not include an initial BWP, and the second BWP includes the SSBs, the first QCL relationship and/or the second QCL relationship are/is indicated by using the QCL information of the SSB with the smallest index in the SSBs included in the second BWP.

It should be understood that, that the second BWP includes the initial BWP means that the initial BWP is a subset of the second BWP.

It should be understood that, that the first QCL relationship is the QCL information of the SSB for the initial access may be understood as that a DMRS for the PDSCH and/or a DMRS for the PDCCH and the SSB satisfy a QCL assumption relationship.

With reference to the first aspect, in a possible implementation, the PDSCH is scheduled by using the downlink control information DCI, and the DCI further includes the BWP switching indication information. In other words, the PDSCH is scheduled by using the DCI located in the first BWP.

With reference to the first aspect, in a possible implementation, if a scheduling offset is greater than or equal to a first threshold, the first QCL relationship is indicated by using QCL information included in the BWP switching indication information; and/or if the scheduling offset is less than the first threshold, the first QCL relationship is indicated by using the default QCL information, where the first threshold is a sum of time required for beam switching and BWP switching of the terminal.

With reference to the first aspect, in a possible implementation, the determining a first QCL relationship based on the association relationship and/or the determining a second QCL relationship based on the association relationship include/includes:

the second QCL relationship is indicated by using at least one of the following QCL information:

QCL information of a control-resource set that is in the first BWP and that is closest to the second BWP in frequency domain.

According to a second aspect, this application provides a communication method. The method includes: determining a first BWP and a second BWP; determining an association relationship between the first BWP and the second BWP; and determining a first QCL relationship based on the association relationship, and sending a PDSCH in the second BWP based on the first QCL relationship; and/or determining a second QCL relationship based on the association relationship, and sending a PDCCH in the second BWP based on the second QCL relationship.

According to the communication method in this embodiment of this application, the first QCL relationship and/or the second QCL relationship can be determined based on the association relationship between the first BWP and the second BWP, so that the PDCCH and/or the PDSCH can be transmitted based on the first QCL relationship and/or the second QCL relationship.

With reference to the second aspect, in a possible implementation, after the determining a first BWP and a second BWP, the method may further include: sending BWP switching indication information, where the BWP switching indication information is used to indicate a terminal to switch from the first BWP to the second BWP.

In other words, the first BWP is before the switching, and the second BWP is after the switching. In this way, according to the communication method in this embodiment of this application, the PDCCH and/or the PDSCH may be sent, based on the association relationship between the BWP before the switching and the BWP after the switching, in the BWP that is after the switching.

With reference to the second aspect, in a possible implementation, the first QCL relationship and the second QCL relationship may be indicated by using QCL information configured by a network device for the first BWP.

Further, the network device may send the PDSCH based on the first QCL relationship and/or send the PDCCH based on the second QCL relationship in the following case: before the network device sends QCL information of a CORESET and/or a PDSCH in the second BWP.

Therefore, according to the communication method in this embodiment of this application, the terminal and the network device may transmit the PDCCH and/or the PDSCH in the second BWP by reusing QCL information of the first BWP and with no need to configure the QCL information after the network device performs beam training, so that a delay problem caused by the beam training can be alleviated. In addition, the network device and the terminal device can align QCL assumptions or beams (a transmit beam and a receive beam) by reusing the QCL information of the first BWP, so that the terminal can accurately receive data, and signaling overheads required for configuring the QCL information by the network device for the second BWP can be reduced.

With reference to the second aspect, in a possible implementation, the association relationship between the first BWP and the second BWP includes at least one of the following cases:

the first BWP and the second BWP partially or completely overlap in frequency domain;

a reference signal configured for the first BWP and a reference signal configured for the second BWP satisfy a QCL relationship;

the first BWP and the second BWP include the same control-resource set; and the first BWP and the second BWP are intra-band BWPs (intra-band BWP).

With reference to the second aspect, in a possible implementation, the determining a first QCL relationship based on the association relationship includes:

the first QCL relationship is indicated by using QCL information included in downlink control information DCI, and the DCI further includes the BWP switching indication information.

It should be understood that the DCI is located in the first BWP. In other words, the QCL information included in the DCI that is located in the first BWP and that is used to indicate BWP switching is the first QCL relationship.

Optionally, the QCL information included in the DCI may be one piece of candidate QCL information configured for the first BWP. In this way, the terminal and the network device may transmit the PDCCH and/or the PDSCH in the second BWP by reusing QCL information of the first BWP and with no need to configure the QCL information after the network device performs beam training, so that a delay problem caused by the beam training can be alleviated. In addition, the network device and the terminal device can align QCL assumptions or beams (a transmit beam and a receive beam) by reusing the QCL information of the first BWP, so that the terminal can accurately receive data, and signaling overheads required for configuring the QCL information by the network device for the second BWP can be reduced.

It should be understood that the DCI may alternatively be one piece of candidate QCL information configured by the network device for the second BWP. This is not limited in this application.

Further, when a scheduling offset is greater than or equal to a first threshold, the first QCL relationship may be QCL information included in DCI used to indicate BWP switching.

With reference to the second aspect, in a possible implementation, the determining a first QCL relationship and/or a second QCL relationship based on the association relationship includes:

the first QCL relationship and/or the second QCL relationship are/is indicated by using default QCL information, and the default QCL information is at least one of the following:

QCL information of a control-resource set with a smallest index or identifier in control-resource sets included in the first BWP or the second BWP;

QCL information of a control-resource set included in both the first BWP and the second BWP;

QCL information of a control-resource set included in the first BWP in a frequency domain resource on which the first BWP and the second BWP overlap;

third QCL information in QCL information configured for a control-resource set and/or a PDSCH in the first BWP, where a reference signal indicated by using the third QCL information is located in the second BWP; and fourth QCL information in QCL information configured for a control-resource set and/or a PDSCH in the second BWP, where a reference signal indicated by using the fourth QCL information is located in the first BWP.

With reference to the second aspect, in a possible implementation, the determining a first QCL relationship based on the association relationship includes:

the first QCL relationship is indicated by using default QCL information, and the default QCL information is QCL information of a control-resource set on which DCI for scheduling the PDSCH is located.

In other words, if DCI #1 in the first BWP schedules the PDSCH in the second BWP, QCL information of a CORESET on which the DCI #1 is located may be used as the first QCL relationship.

With reference to the second aspect, in a possible implementation, the determining a first QCL relationship based on the association relationship and/or the determining a second QCL relationship based on the association relationship include/includes:

the first QCL relationship and/or the second QCL relationship are/is indicated by using default QCL information, and the default QCL information is at least one of the following:

one of pieces of QCL information configured for a control-resource set and/or a PDSCH in the second BWP;

QCL information of a synchronization signal/physical broadcast channel block SSB used for initial access;

QCL information used to receive a broadcast PDCCH; and

QCL information of an SSB with a smallest index in SSBs included in the second BWP.

Further, if the second BWP is an initial BWP or includes an initial BWP, or if the second BWP does not include an SSB, the first QCL relationship and/or the second QCL relationship are/is indicated by using the QCL information of the SSB used for the initial access or the QCL information used to receive the broadcast PDCCH; and/or if the second BWP does not include an initial BWP, and the second BWP includes the SSBs, the first QCL relationship and/or the second QCL relationship are/is indicated by using the QCL information of the SSB with the smallest index in the SSBs included in the second BWP.

With reference to the second aspect, in a possible implementation, the PDSCH is scheduled by using the downlink control information DCI, and the DCI further includes the BWP switching indication information. In other words, the PDSCH is scheduled by using the DCI located in the first BWP.

With reference to the second aspect, in a possible implementation, if a scheduling offset is greater than or equal to a first threshold, the first QCL relationship is indicated by using QCL information included in the BWP switching indication information; and/or if the scheduling offset is less than the first threshold, the first QCL relationship is indicated by using the default QCL information, where the first threshold is a sum of time required for beam switching and BWP switching of the terminal.

With reference to the second aspect, in a possible implementation, the determining a first QCL relationship based on the association relationship and/or the determining a second QCL relationship based on the association relationship include/includes:

the second QCL relationship is indicated by using at least one of the following QCL information:

QCL information of a control-resource set that is in the first BWP and that is closest to the second BWP in frequency domain.

For details of the second aspect, refer to the description of the first aspect. Details are not described herein again.

According to a third aspect, a communication method is provided. The method includes: determining a first BWP and a second BWP; and determining a first QCL relationship, and receiving a PDSCH in the second BWP based on the first QCL relationship; and/or, determine a second QCL relationship, and receiving a PDCCH in the second BWP based on the second QCL relationship.

The first QCL relationship may be specific QCL information or indicated by using the QCL information. The QCL information may be configured by a network device for a terminal by using signaling, or a terminal may assume, based on a preset condition, that some parameters of the second BWP and some parameters of the first BWP are QCL or have some association relationships. For example, the network device may indicate a TCI state of the PDSCH or the PDCCH by using signaling. The TCI state is used to indicate that a DMRS for the PDSCH or the PDCCH and a reference signal included in the TCI state satisfy a QCL relationship. Alternatively, it may be assumed in a predefined manner that a DMRS for the PDSCH or the PDCCH and a reference signal (for example, a synchronization signal/physical broadcast channel block (synchronization signal/PBCH block, SSB)) satisfy a (spatial) QCL relationship. For the second QCL relationship, refer to the description of the first QCL relationship. Further, the first QCL relationship may be the same as the second QCL relationship. However, this is not limited in this application.

According to the communication method in this embodiment of this application, the first QCL relationship and/or the second QCL relationship are/is determined, so that the PDCCH and/or the PDSCH can be transmitted based on the first QCL relationship and/or the second QCL relationship.

With reference to the third aspect, in a possible implementation, the determining a first QCL relationship includes: determining the first QCL relationship based on an association relationship between the first BWP and the second BWP; and/or the determining a second QCL relationship includes: determining the second QCL relationship based on an association relationship between the first BWP and the second BWP.

According to the communication method in this embodiment of this application, after determining the first BWP and the second BWP, the network device and the terminal device can transmit the PDCCH and/or the PDSCH in the second BWP based on the first QCL relationship and/or the second QCL relationship.

With reference to the third aspect, in a possible implementation, the determining a first BWP and a second BWP includes: receiving BWP switching indication information; and switching from the first BWP to the second BWP based on the BWP switching indication information.

In other words, the first BWP is before the switching, and the second BWP is after the switching. In this way, according to the communication method in this embodiment of this application, the PDCCH and/or the PDSCH may be received, based on the association relationship between the BWP before the switching and the BWP after the switching, in the BWP that is after the switching.

The first BWP and the second BWP may be on one carrier, or may be on a plurality of carriers. For example, the first BWP may be configured on a carrier #1, and the second BWP may be configured on a carrier #2. The carrier #1 and the carrier #2 may be two carriers on which carrier aggregation is performed.

In addition, the terminal may access a plurality of carriers, and one BWP may be configured for each carrier. To be specific, there may be a plurality of active BWPs. The first BWP may be a BWP for which QCL information has been configured and that is in the plurality of active BWPs, and the second BWP may be a BWP for which no QCL information has been configured and that is in the plurality of active BWPs. In this way, according to the method in this embodiment of this application, the PDCCH and/or the PDSCH may be received in the second BWP based on the association relationship between the first BWP and the second BWP before the QCL information is configured for the second BWP.

With reference to the third aspect, in a possible implementation, the first QCL relationship and the second QCL relationship may be indicated by using QCL information configured by the network device for the first BWP.

Further, the terminal may receive the PDSCH based on the first QCL relationship and/or receive the PDCCH based on the second QCL relationship in the following case: before the terminal receives QCL information of a CORESET and/or the PDSCH in the second BWP.

Therefore, according to the communication method in this embodiment of this application, the terminal and the network device may transmit the PDCCH and/or the PDSCH in the second BWP by reusing QCL information of the first BWP and with no need to configure the QCL information after the network device performs beam training, so that a delay problem caused by the beam training can be alleviated. In addition, the network device and the terminal device can align QCL assumptions or beams (a transmit beam and a receive beam) by reusing the QCL information of the first BWP, so that the terminal can accurately receive data, and signaling overheads required for configuring the QCL information by the network device for the second BWP can be reduced.

With reference to the third aspect, in a possible implementation, the association relationship between the first BWP and the second BWP includes at least one of the following cases:

the first BWP and the second BWP partially or completely overlap in frequency domain;

a reference signal configured for the first BWP and a reference signal configured for the second BWP satisfy a QCL relationship;

the first BWP and the second BWP include the same control-resource set; and the first BWP and the second BWP are intra-band BWPs (intra-band BWP).

Specifically, that the first BWP and the second BWP overlap in frequency domain may alternatively be understood as that the first BWP and the second BWP include a same resource block (resource block, RB). That the first BWP and the second BWP overlap in frequency domain may be any one of the following: A: The first BWP and the second BWP partially overlap in frequency domain, and there is no inclusion relationship between the first BWP and the second BWP. To be specific, the first BWP and the second BWP include the same RB, but the first BWP is not a subset of the second BWP, and the second BWP is also not a subset of the first BWP. B: The first BWP is a proper subset of the second BWP. To be specific, the second BWP includes all RBs included in the first BWP, and at least one of all RBs included in the second BWP is different from the RBs included in the first BWP. C: The second BWP is a proper subset of the first BWP. To be specific, the first BWP includes all RBs included in the second BWP, and at least one of all RBs included in the first BWP is different from the RBs included in the second BWP. D: The second BWP and the first BWP completely overlap. To be specific, RBs included in the second BWP and the first BWP are the same. In this case, some parameters of the first BWP and the second BWP may be different. For example, subcarrier spacings of the first BWP and the second BWP may be different, and CORESETs configured for the first BWP and the second BWP may be different.

The first BWP and the second BWP include a same CORESET. To be specific, the first BWP and the second BWP overlap in frequency domain, and at least one CORESET configured by the network device in an overlapping area that is of the first BWP and the second BWP and that is in the first BWP is partially or completely the same as at least one CORESET configured by the device in an overlapping area that is of the first BWP and the second BWP and that is in the second BWP.

The reference signal configured by the network device for the first BWP and the reference signal configured by the network device for the second BWP satisfy the QCL relationship. Specifically, a reference signal indicated by using QCL information configured by the network device for a CORESET and/or a PDSCH included in the first BWP includes a reference signal of the second BWP. Alternatively, a reference signal indicated by using QCL information configured by the network device for a reference signal included in the first BWP is a reference signal of the second BWP. For example, if a TCI state configured by the network device for a CORESET #1 in the first BWP includes a reference signal CSI-RS #1, and the CSI-RS #1 is the reference signal of the second BWP, it is considered that there is the association relationship between the first BWP and the second BWP. Alternatively, a reference signal indicated by using QCL information configured by the network device for a CORESET and/or a PDSCH included in the second BWP includes a reference signal of the first BWP. Alternatively, a reference signal indicated by using QCL information configured by the network device for a reference signal included in the second BWP is a reference signal of the first BWP. For example, if a TCI state configured by the network device for a CORESET #2 in the second BWP includes a reference signal CSI-RS #2, and the CSI-RS #2 is the reference signal of the first BWP, it is considered that there is the association relationship between the first BWP and the second BWP.

With reference to the third aspect, in a possible implementation, the determining a first QCL relationship includes:

the first QCL relationship is indicated by using QCL information included in downlink control information DCI, and the DCI further includes the BWP switching indication information.

It should be understood that the DCI is located in the first BWP. In other words, the QCL information included in the DCI that is located in the first BWP and that is used to indicate BWP switching is the first QCL relationship.

Optionally, the QCL information included in the DCI may be one piece of candidate QCL information configured for the first BWP. In this way, the terminal and the network device may transmit the PDCCH and/or the PDSCH in the second BWP by reusing QCL information of the first BWP and with no need to configure the QCL information after the network device performs beam training, so that a delay problem caused by the beam training can be alleviated. In addition, the network device and the terminal device can align QCL assumptions or beams (a transmit beam and a receive beam) by reusing the QCL information of the first BWP, so that the terminal can accurately receive data, and signaling overheads required for configuring the QCL information by the network device for the second BWP can be reduced.

It should be understood that the DCI may alternatively be one piece of candidate QCL information configured for the second BWP. This is not limited in this application.

Further, when a scheduling offset is greater than or equal to a first threshold, the first QCL relationship may be QCL information included in DCI used to indicate BWP switching.

In this application, the scheduling offset is a time offset between the downlink DCI and the PDSCH.

For example, the first threshold may be reported by the terminal based on a capability of the terminal, may be configured by the network device, or may be predefined. In a case of cross-BWP scheduling, for example, when DCI in the first BWP is used to schedule a PDSCH in the second BWP, the first threshold is a sum of time required for beam switching and the BWP switching. In a case of scheduling in a same BWP, for example, when DCI in the second BWP is used to schedule a PDSCH in the second BWP, the first threshold is a time required for beam switching.

With reference to the third aspect, in a possible implementation, the determining a first QCL relationship and/or a second QCL relationship includes:

QCL information of a control-resource set with a smallest index or identifier in control-resource sets included in the first BWP or the second BWP;

QCL information of a control-resource set included in both the first BWP and the second BWP;

QCL information of a control-resource set included in the first BWP in a frequency domain resource on which the first BWP and the second BWP overlap;

third QCL information in QCL information configured for a control-resource set and/or a PDSCH in the first BWP, where a reference signal indicated by using the third QCL information is located in the second BWP; and fourth QCL information in QCL information configured for a control-resource set and/or a PDSCH in the second BWP, where a reference signal indicated by using the fourth QCL information is located in the first BWP.

Optionally, a control-resource set included in the first BWP or the second BWP may be a CORESET for which valid QCL information is configured, namely, a CORESET for which QCL information is configured and that is in all the control-resource sets included in the first BWP or the second BWP.

Optionally, a control-resource set included in the first BWP or the second BWP may be a CORESET with a smallest identifier value or index value in control-resource sets used for broadcast PDCCH sending or a CORESET with a smallest identifier value or index value in control-resource sets used for non-broadcast PDCCH sending With reference to the third aspect, in a possible implementation, the determining a first QCL relationship includes:

if there is the association relationship between the first BWP and the second BWP, the first QCL relationship is indicated by using default QCL information, and the default QCL information is QCL information of a control-resource set on which DCI for scheduling the PDSCH is located.

In other words, if DCI #1 in the first BWP schedules the PDSCH in the second BWP, QCL information of a CORESET on which the DCI #1 is located may be used as the first QCL relationship.

With reference to the third aspect, in a possible implementation, the determining a first QCL relationship and/or the determining a second QCL relationship include/includes:

the first QCL relationship and/or the second QCL relationship are/is indicated by using default QCL information, and the default QCL information is at least one of the following:

one of pieces of QCL information configured for a control-resource set and/or a PDSCH in the second BWP;

QCL information of a synchronization signal/physical broadcast channel block SSB used for initial access;

QCL information used to receive a broadcast PDCCH; and

QCL information of an SSB with a smallest index in SSBs included in the second BWP.

Further, if the second BWP is an initial BWP or includes an initial BWP, or if the second BWP does not include an SSB, the first QCL relationship and/or the second QCL relationship are/is indicated by using the QCL information of the SSB used for the initial access or the QCL information used to receive the broadcast PDCCH; and/or if the second BWP does not include an initial BWP, and the second BWP includes the SSBs, the first QCL relationship and/or the second QCL relationship are/is indicated by using the QCL information of the SSB with the smallest index in the SSBs included in the second BWP.

It should be understood that, that the second BWP includes the initial BWP means that the initial BWP is a subset of the second BWP.

It should be understood that, that the first QCL relationship is the QCL information of the SSB for the initial access may be understood as that a DMRS for the PDSCH and/or a DMRS for the PDCCH and the SSB satisfy a QCL assumption relationship.

With reference to the third aspect, in a possible implementation, the PDSCH is scheduled by using the downlink control information DCI, and the DCI further includes the BWP switching indication information. In other words, the PDSCH is scheduled by using the DCI located in the first BWP.

With reference to the third aspect, in a possible implementation, if a scheduling offset is greater than or equal to a first threshold, the first QCL relationship is indicated by using QCL information included in the BWP switching indication information; and/or if the scheduling offset is less than the first threshold, the first QCL relationship is indicated by using the default QCL information, where the first threshold is a sum of time required for beam switching and BWP switching of the terminal.

With reference to the third aspect, in a possible implementation, the determining a first quasi co-location QCL relationship and/or the determining a second QCL relationship include/includes:

the second QCL relationship is indicated by using at least one of the following QCL information:

QCL information of a control-resource set that is in the first BWP and that is closest to the second BWP in frequency domain.

According to a fourth aspect, a communication method is provided. The method includes: determining a first BWP and a second BWP; and sending a PDSCH in the second BWP based on a first QCL relationship; and/or determining a second QCL relationship, and sending a PDCCH in the second BWP based on the second QCL relationship.

According to the communication method in this embodiment of this application, the first QCL relationship and/or the second QCL relationship are/is determined, so that the PDCCH and/or the PDSCH can be transmitted based on the first QCL relationship and/or the second QCL relationship.

With reference to the fourth aspect, in a possible implementation, the determining a first QCL relationship includes: determining the first QCL relationship based on an association relationship between the first BWP and the second BWP; and/or the determining a first QCL relationship includes: determining the second QCL relationship based on an association relationship between the first BWP and the second BWP.

According to the communication method in this embodiment of this application, after determining the first BWP and the second BWP, a network device and a terminal device can transmit the PDCCH and/or the PDSCH in the second BWP based on the first QCL relationship and/or the second QCL relationship.

With reference to the fourth aspect, in a possible implementation, after the determining a first BWP and a second BWP, the method may further include: sending BWP switching indication information, where the BWP switching indication information is used to indicate a terminal to switch from the first BWP to the second BWP.

With reference to the fourth aspect, in a possible implementation, the first QCL relationship and the second QCL relationship may be indicated by using QCL information configured by the network device for the first BWP.

Further, the PDSCH may be sent based on the first QCL relationship and/or the PDCCH may be sent based on the second QCL relationship in the following case: before QCL information of a CORESET and/or the PDSCH is sent in the second BWP.

Therefore, according to the communication method in this embodiment of this application, the terminal and the network device may transmit the PDCCH and/or the PDSCH in the second BWP by reusing QCL information of the first BWP and with no need to configure the QCL information after the network device performs beam training, so that a delay problem caused by the beam training can be alleviated. In addition, the network device and the terminal device can align QCL assumptions or beams (a transmit beam and a receive beam) by reusing the QCL information of the first BWP, so that the terminal can accurately receive data, and signaling overheads required for configuring the QCL information by the network device for the second BWP can be reduced.

With reference to the fourth aspect, in a possible implementation, the association relationship between the first BWP and the second BWP includes at least one of the following cases:

the first BWP and the second BWP partially or completely overlap in frequency domain;

a reference signal configured for the first BWP and a reference signal configured for the second BWP satisfy a quasi co-location QCL relationship;

the first BWP and the second BWP include the same control-resource set; and the first BWP and the second BWP are intra-band BWPs (intra-band BWP).

With reference to the fourth aspect, in a possible implementation, the determining a first quasi co-location QCL relationship includes:

the first QCL relationship is indicated by using QCL information included in downlink control information DCI, and the DCI further includes the BWP switching indication information.

It should be understood that the DCI is located in the first BWP. In other words, the QCL information included in the DCI that is located in the first BWP and that is used to indicate BWP switching is the first QCL relationship.

Optionally, the QCL information included in the DCI may be one piece of candidate QCL information configured for the first BWP. In this way, the terminal and the network device may transmit the PDCCH and/or the PDSCH in the second BWP by reusing QCL information of the first BWP and with no need to configure the QCL information after the network device performs beam training, so that a delay problem caused by the beam training can be alleviated. In addition, the network device and the terminal device can align QCL assumptions or beams (a transmit beam and a receive beam) by reusing the QCL information of the first BWP, so that the terminal can accurately receive data, and signaling overheads required for configuring the QCL information by the network device for the second BWP can be reduced.

It should be understood that the DCI may alternatively be one piece of candidate QCL information configured for the second BWP. This is not limited in this application.

Further, when a scheduling offset is greater than or equal to a first threshold, the first QCL relationship may be QCL information included in DCI used to indicate BWP switching.

With reference to the fourth aspect, in a possible implementation, the determining a first quasi co-location QCL relationship and/or a second QCL relationship includes:

QCL information of a control-resource set with a smallest index or identifier in control-resource sets included in the first BWP or the second BWP;

QCL information of a control-resource set included in both the first BWP and the second BWP;

QCL information of a control-resource set included in the first BWP in a frequency domain resource on which the first BWP and the second BWP overlap;

third QCL information in QCL information configured for a control-resource set and/or a PDSCH in the first BWP, where a reference signal indicated by using the third QCL information is located in the second BWP; and fourth QCL information in QCL information configured for a control-resource set and/or a PDSCH in the second BWP, where a reference signal indicated by using the fourth QCL information is located in the first BWP.

Optionally, a control-resource set included in the first BWP or the second BWP may be a CORESET for which valid QCL information is configured, namely, a CORESET for which QCL information is configured and that is in all the control-resource sets included in the first BWP or the second BWP.

Optionally, a control-resource set included in the first BWP or the second BWP may be a CORESET with a smallest identifier value or index value in control-resource sets used for broadcast PDCCH sending or a CORESET with a smallest identifier value or index value in control-resource sets used for non-broadcast PDCCH sending.

With reference to the fourth aspect, in a possible implementation, the determining a first quasi co-location QCL relationship includes:

if there is the association relationship between the first BWP and the second BWP, the first QCL relationship is indicated by using default QCL information, and the default QCL information is QCL information of a control-resource set on which DCI for scheduling the PDSCH is located.

With reference to the fourth aspect, in a possible implementation, the determining a first quasi co-location QCL relationship and/or the determining a second QCL relationship include/includes:

the first QCL relationship and/or the second QCL relationship are/is indicated by using default QCL information, and the default QCL information is at least one of the following:

one of pieces of QCL information configured for a control-resource set and/or a PDSCH in the second BWP;

QCL information of a synchronization signal/physical broadcast channel block SSB used for initial access;

QCL information used to receive a broadcast PDCCH; and

QCL information of an SSB with a smallest index in SSBs included in the second BWP.

Further, if the second BWP is an initial BWP or includes an initial BWP, or if the second BWP does not include an SSB, the first QCL relationship and/or the second QCL relationship are/is indicated by using the QCL information of the SSB used for the initial access or the QCL information used to receive the broadcast PDCCH; and/or if the second BWP does not include an initial BWP, and the second BWP includes the SSBs, the first QCL relationship and/or the second QCL relationship are/is indicated by using the QCL information of the SSB with the smallest index in the SSBs included in the second BWP.

With reference to the fourth aspect, in a possible implementation, the PDSCH is scheduled by using the downlink control information DCI, and the DCI further includes the BWP switching indication information. In other words, the PDSCH is scheduled by using the DCI located in the first BWP.

With reference to the fourth aspect, in a possible implementation, if a scheduling offset is greater than or equal to a first threshold, the first QCL relationship is indicated by using QCL information included in the BWP switching indication information; and/or if the scheduling offset is less than the first threshold, the first QCL relationship is indicated by using the default QCL information, where the first threshold is a sum of time required for beam switching and BWP switching of the terminal.

With reference to the fourth aspect, in a possible implementation, the determining a first quasi co-location QCL relationship and/or the determining a second QCL relationship include/includes:

the second QCL relationship is indicated by using at least one of the following QCL information:

QCL information of a control-resource set that is in the first BWP and that is closest to the second BWP in frequency domain.

For details of the fourth aspect, refer to the description of the third aspect. Details are not described herein again.

According to a fifth aspect, a communication method is provided. The communication method includes: determining a first BWP and a second BWP; and receiving a physical downlink shared channel PDSCH in the second BWP based on a transmission configuration indicator TCI state for the first BWP, and/or receiving a physical downlink control channel PDCCH in the second BWP based on a transmission configuration indicator TCI state for the first BWP.

According to the communication method in this embodiment of this application, the terminal can receive the PDCCH and/or the PDSCH in the second BWP by using, in advance by reusing a TCI state for the first BWP and with no need to configure a TCI state after a network device performs beam training, more accurate QCL information obtained based on dynamic or semi-static signaling, so that a delay problem caused by the beam training can be alleviated. In addition, signaling overheads required for configuring the TCI state by the network device for the second BWP can be reduced by reusing the TCI state for the first BWP.

With reference to the fifth aspect, in a possible implementation, the determining a first BWP and a second BWP includes: receiving BWP switching indication information; and switching from the first BWP to the second BWP based on the BWP switching indication information.

In other words, the first BWP is before the switching, and the second BWP is after the switching. In this way, according to the communication method in this embodiment of this application, the PDCCH and/or the PDSCH may be received, based on an association relationship between the BWP before the switching and the BWP after the switching, in the BWP that is after the switching.

The first BWP and the second BWP may be on one carrier, or may be on a plurality of carriers. For example, the first BWP may be configured on a carrier #1, and the second BWP may be configured on a carrier #2. The carrier #1 and the carrier #2 may be two carriers on which carrier aggregation is performed.

In addition, the terminal may access a plurality of carriers, and one BWP may be configured for each carrier. To be specific, there may be a plurality of active BWPs. The first BWP may be a BWP for which the TCI state has been configured and that is in a plurality of active BWPs, and the second BWP may be a BWP for which no TCI state has been configured and that is in the plurality of active BWPs. In this way, according to the method in this embodiment of this application, the PDCCH and/or the PDSCH may be received in the second BWP based on the association relationship between the first BWP and the second BWP before the TCI state is configured for the second BWP.

With reference to the fifth aspect, in a possible implementation, the receiving a PDSCH in the second BWP based on a transmission configuration indicator TCI state for the first BWP, and/or receiving a PDCCH in the second BWP based on a transmission configuration indicator TCI state for the first BWP includes:

when there is the association relationship between the first BWP and the second BWP, receiving the PDSCH in the second BWP and/or receiving the PDCCH in the second BWP based on the transmission configuration indicator TCI state for the first BWP.

With reference to the fifth aspect, in a possible implementation, the association relationship between the first BWP and the second BWP includes at least one of the following cases:

the first BWP and the second BWP partially or completely overlap in frequency domain;

a reference signal configured for the first BWP and a reference signal configured for the second BWP satisfy a quasi co-location QCL relationship;

the first BWP and the second BWP include the same control-resource set; and the first BWP and the second BWP are intra-band BWPs (intra-band BWP).

Specifically, that the first BWP and the second BWP overlap in frequency domain may alternatively be understood as that the first BWP and the second BWP include a same resource block (resource block, RB). That the first BWP and the second BWP overlap in frequency domain may be any one of the following: A: The first BWP and the second BWP partially overlap in frequency domain, and there is no inclusion relationship between the first BWP and the second BWP. To be specific, the first BWP and the second BWP include the same RB, but the first BWP is not a subset of the second BWP, and the second BWP is also not a subset of the first BWP. B: The first BWP is a proper subset of the second BWP. To be specific, the second BWP includes all RBs included in the first BWP, and at least one of all RBs included in the second BWP is different from the RBs included in the first BWP. C: The second BWP is a proper subset of the first BWP. To be specific, the first BWP includes all RBs included in the second BWP, and at least one of all RBs included in the first BWP is different from the RBs included in the second BWP. D: The second BWP and the first BWP completely overlap. To be specific, RBs included in the second BWP and the first BWP are the same. In this case, some parameters of the first BWP and the second BWP may be different. For example, subcarrier spacings of the first BWP and the second BWP may be different, and CORESETs configured for the first BWP and the second BWP may be different.

The first BWP and the second BWP include a same CORESET. To be specific, the first BWP and the second BWP overlap in frequency domain, and at least one CORESET configured by the network device in an overlapping area that is of the first BWP and the second BWP and that is in the first BWP is partially or completely the same as at least one CORESET configured by the device in an overlapping area that is of the first BWP and the second BWP and that is in the second BWP.

The reference signal configured by the network device for the first BWP and the reference signal configured by the network device for the second BWP satisfy the QCL relationship. Specifically, a reference signal indicated by using a TCI state configured by the network device for a CORESET and/or a PDSCH included in the first BWP includes a reference signal of the second BWP. Alternatively, a reference signal indicated by using a TCI state configured by the network device for a reference signal included in the first BWP is a reference signal of the second BWP. For example, if a TCI state configured by the network device for a CORESET #1 in the first BWP includes a reference signal CSI-RS #1, and the CSI-RS #1 is the reference signal of the second BWP, it is considered that there is the association relationship between the first BWP and the second BWP. Alternatively, a reference signal indicated by using a TCI state configured by the network device for a CORESET and/or a PDSCH included in the second BWP includes a reference signal of the first BWP. Alternatively, a reference signal indicated by using a TCI state configured by the network device for a reference signal included in the second BWP is a reference signal of the first BWP. For example, if a TCI state configured by the network device for a CORESET #2 in the second BWP includes a reference signal CSI-RS #2, and the CSI-RS #2 is the reference signal of the first BWP, it is considered that there is the association relationship between the first BWP and the second BWP.

With reference to the fifth aspect, in a possible implementation, the receiving a physical downlink shared channel PDCCH in the second BWP based on a transmission configuration indicator TCI state for the first BWP includes:

receiving the PDCCH in the second BWP based on a TCI state that is indicated by using media access control signaling or radio resource control RRC signaling and that is used for a PDCCH in the first BWP.

It should be understood that the media access control signaling is sent by the network device in the first BWP. If a plurality of TCI states are activated by using the media access control signaling, the terminal may use any one of the plurality of TCI states, a TCI state with a smallest index or a largest index, or all TCI states. This is not limited in this embodiment of this application.

It should be noted that the media access control signaling in this application is layer 2 signaling, and the layer 2 signaling may be MAC layer signaling, a media access control control unit (media access control control element, MAC-CE), or the like.

In this embodiment of this application, the terminal receives the PDCCH in the second BWP by reusing the TCI state that is indicated by using the media access control signaling and that is used for the PDCCH in the first BWP, so that signaling overheads required for configuring the TCI state by the network device for the second BWP can be reduced. In addition, a delay caused by configuring the TCI state by the network device for the second BWP can be reduced.

With reference to the fifth aspect, in a possible implementation, the receiving a physical downlink shared channel PDCCH in the second BWP based on a transmission configuration indicator TCI state for the first BWP includes:

receiving media access control signaling, where the media access control signaling is used to indicate that one or more, configured by using radio resource control RRC signaling, of a plurality of candidate TCI states used for the first BWP are used to receive the PDCCH in the second BWP; and receiving the PDCCH in the second BWP based on the one or more TCI states.

With reference to the fifth aspect, in a possible implementation, the receiving a physical downlink shared channel PDCCH in the second BWP based on a transmission configuration indicator TCI state for the first BWP includes:

receiving, based on a TCI state of a control-resource set that is in the first BWP and that is the same as a control-resource set in the second BWP, a PDCCH on a control-resource set that is in the second BWP and that is the same as a control-resource set in the first BWP.

With reference to the fifth aspect, in a possible implementation, the receiving a physical downlink shared channel PDCCH in the second BWP based on a transmission configuration indicator TCI state for the first BWP includes:

receiving, based on a TCI state of a control-resource set that is in the first BWP and that is the same as a control-resource set in the second BWP, a PDCCH on a control-resource set that is in the second BWP and that is different from a control-resource set in the first BWP.

With reference to the fifth aspect, in a possible implementation, the receiving a physical downlink shared channel PDCCH in the second BWP based on a transmission configuration indicator TCI state for the first BWP includes:

receiving the PDCCH in the second BWP based on a TCI state of a control-resource set included in the first BWP in an overlapping frequency domain resource of the first BWP and the second BWP.

With reference to the fifth aspect, in a possible implementation, the receiving a physical downlink shared channel PDCCH in the second BWP based on a transmission configuration indicator TCI state for the first BWP includes:

receiving the PDCCH in the second BWP in a manner in which control-resource sets of the second BWP corresponds to control-resource sets of the first BWP in ascending order of identifiers or indexes.

With reference to the fifth aspect, in a possible implementation, the receiving a physical downlink shared channel PDSCH in the second BWP based on a transmission configuration indicator TCI state for the first BWP includes:

receiving downlink control information DCI, where the DCI signaling is used to indicate that one or more, configured by using media access control signaling, of a plurality of candidate TCI states used for the first BWP are used to receive the PDCCH in the second BWP, and the plurality of candidate TCI states for the first BWP include a plurality of candidate TCI states configured for a PDCCH and/or a PDSCH in the first BWP; and receiving the PDSCH in the second BWP based on the one or more TCI states.

With reference to the fifth aspect, in a possible implementation, the receiving a physical downlink shared channel PDSCH in the second BWP based on a transmission configuration indicator TCI state for the first BWP includes:

receiving media access control signaling, where the media access control signaling is used to indicate that one or more, configured by using RRC signaling, of a plurality of candidate TCI states used for the first BWP are used to receive the PDSCH in the second BWP; and receiving the PDSCH in the second BWP based on the one or more TCI states.

With reference to the fifth aspect, in a possible implementation, the receiving a physical downlink shared channel PDSCH in the second BWP based on a transmission configuration indicator TCI state for the first BWP includes:

receiving the PDSCH in the second BWP based on one or more TCI states that are used for the first BWP and that are indicated by using downlink control information DCI.

With reference to the fifth aspect, in a possible implementation, receiving, by the terminal, the downlink shared channel PDSCH in the second BWP based on the transmission configuration indicator TCI state for the first BWP includes:

receiving, by the terminal, media access control signaling, where the media access control signaling indicates one or more, configured by using RRC, of one or more candidate TCI states used for the first BWP; and receiving, by the terminal, the PDSCH in the second BWP based on the one or more TCI states.

With reference to the fifth aspect, in a possible implementation, the DCI further includes the BWP switching indication information.

According to a sixth aspect, a communication method is provided. The communication method includes: determining a first BWP and a second BWP; and sending a physical downlink shared channel PDSCH in the second BWP based on a transmission configuration indicator TCI state for the first BWP, and/or sending a physical downlink control channel PDCCH in the second BWP based on a transmission configuration indicator TCI state for the first BWP.

According to the communication method in this embodiment of this application, the terminal can receive the PDCCH and/or the PDSCH in the second BWP by using, in advance by reusing a TCI state for the first BWP and with no need to configure a TCI state after a network device performs beam training, more accurate QCL information obtained based on dynamic or semi-static signaling, so that a delay problem caused by the beam training can be alleviated. In addition, signaling overheads required for configuring the TCI state by the network device for the second BWP can be reduced by reusing the TCI state for the first BWP.

With reference to the sixth aspect, in a possible implementation, after the determining a first BWP and a second BWP, the method may further include: sending BWP switching indication information, where the BWP switching indication information is used to indicate a terminal to switch from the first BWP to the second BWP.

With reference to the sixth aspect, in a possible implementation, the sending a physical downlink shared channel PDSCH in the second BWP based on a transmission configuration indicator TCI state for the first BWP, and/or sending a physical downlink control channel PDCCH in the second BWP based on a transmission configuration indicator TCI state for the first BWP includes:

when there is an association relationship between the first BWP and the second BWP, sending the PDSCH in the second BWP based on the transmission configuration indicator TCI state for the first BWP, and/or sending the PDCCH in the second BWP based on the transmission configuration indicator TCI state for the first BWP.

With reference to the sixth aspect, in a possible implementation, the association relationship between the first BWP and the second BWP includes at least one of the following cases:

the first BWP and the second BWP partially or completely overlap in frequency domain;

a reference signal configured for the first BWP and a reference signal configured for the second BWP satisfy a QCL relationship;

the first BWP and the second BWP include the same control-resource set; and the first BWP and the second BWP are intra-band BWPs (intra-band BWP).

With reference to the sixth aspect, in a possible implementation, the sending a physical downlink control channel PDCCH in the second BWP based on a transmission configuration indicator TCI state for the first BWP includes:

sending the PDCCH in the second BWP based on a TCI state that is indicated by using media access control signaling or radio resource control RRC signaling and that is used for a PDCCH in the first BWP.

In this embodiment of this application, the terminal receives the PDCCH in the second BWP by reusing the TCI state that is indicated by using the media access control signaling and that is used for the PDCCH in the first BWP, so that signaling overheads required for configuring the TCI state by the network device for the second BWP can be reduced. In addition, a delay caused by configuring the TCI state by the network device for the second BWP can be reduced.

With reference to the sixth aspect, in a possible implementation, the sending a physical downlink control channel PDCCH in the second BWP based on a transmission configuration indicator TCI state for the first BWP includes:

sending the PDCCH in the second BWP based on one or more TCI states indicated by using media access control signaling sent in the first BWP, where the media access control signaling is used to indicate that one or more, configured by using radio resource control RRC signaling, of a plurality of candidate TCI states used for the first BWP are used to receive the PDCCH in the second BWP.

With reference to the sixth aspect, in a possible implementation, the sending a PDCCH in the second BWP based on a transmission configuration indicator TCI state for the first BWP includes:

sending, based on a TCI state of a control-resource set that is in the first BWP and that is the same as a control-resource set in the second BWP, a PDCCH on a control-resource set that is in the second BWP and that is the same as a control-resource set in the first BWP.

With reference to the sixth aspect, in a possible implementation, the sending a PDCCH in the second BWP based on a transmission configuration indicator TCI state for the first BWP includes:

sending, based on a TCI state of a control-resource set that is in the first BWP and that is the same as a control-resource set in the second BWP, a PDCCH on a control-resource set that is in the second BWP and that is different from a control-resource set in the first BWP.

With reference to the sixth aspect, in a possible implementation, the sending a PDCCH in the second BWP based on a transmission configuration indicator TCI state for the first BWP includes:

sending the PDCCH in the second BWP based on a TCI state of a control-resource set included in the first BWP in an overlapping frequency domain resource of the first BWP and the second BWP.

With reference to the sixth aspect, in a possible implementation, the sending a PDCCH in the second BWP based on a transmission configuration indicator TCI state for the first BWP includes:

sending the PDCCH in the second BWP in a manner in which control-resource sets of the second BWP corresponds to control-resource sets of the first BWP in ascending order of identifiers or indexes.

With reference to the sixth aspect, in a possible implementation, the sending a PDSCH in the second BWP based on a transmission configuration indicator TCI state for the first BWP includes:

sending the PDSCH in the second BWP based on one or more TCI states indicated by using DCI sent in the first BWP, where the DCI is used to indicate that one or more, configured by using media access control signaling, of a plurality of candidate TCI states used for the first BWP are used to receive the PDCCH in the second BWP, and the plurality of candidate TCI states for the first BWP include a plurality of candidate TCI states configured for a PDCCH and/or a PDSCH in the first BWP.

With reference to the sixth aspect, in a possible implementation, the sending a PDSCH in the second BWP based on a transmission configuration indicator TCI state for the first BWP includes:

sending the PDSCH in the second BWP based on one or more TCI states indicated by using media access control signaling sent in the first BWP, where the media access control signaling is used to indicate that one or more, configured by using RRC signaling, of a plurality of candidate TCI states used for the first BWP are used to receive the PDSCH in the second BWP.

With reference to the sixth aspect, in a possible implementation, the sending a PDSCH in the second BWP based on a transmission configuration indicator TCI state for the first BWP includes:

sending the PDSCH in the second BWP based on one or more TCI states that are used for the first BWP and that are indicated by using downlink control information DCI sent in the first BWP.

With reference to the sixth aspect, in a possible implementation, the sending a PDSCH in the second BWP based on a transmission configuration indicator TCI state for the first BWP includes:

sending the PDSCH in the second BWP based on the one or more TCI states indicated by using the media access control signaling sent in the first BWP, where the media access control signaling indicates the one or more, configured by using the RRC, of the one or more candidate TCI states used for the first BWP; and receiving, by the terminal, the PDSCH in the second BWP based on the one or more TCI states.

With reference to the sixth aspect, in a possible implementation, the DCI further includes the BWP switching indication information.

For details of the sixth aspect, refer to the description of the fifth aspect. Details are not described herein again.

According to a seventh aspect, a communications apparatus is provided, and includes units configured to perform the steps in any one of the first aspect to the sixth aspect or the implementations of the first aspect to the sixth aspect.

In a design, the apparatus is a communications chip. The communications chip may include an input circuit or interface configured to send information or data, and an output circuit or interface configured to receive information or data.

In another design, the apparatus is a terminal. The terminal may include a transmitter configured to send information or data, and a receiver configured to receive information or data.

In still another design, the apparatus is a network device. The network device may include a transmitter configured to send information or data, and a receiver configured to receive information or data.

According to an eighth aspect, a communications device is provided, and includes a processor and a memory. The memory is configured to store a computer program. The processor is configured to invoke the computer program from the memory and run the computer program, so that the communications device performs the method according to any one of the first aspect to the sixth aspect or the implementations of the first aspect to the sixth aspect.

Optionally, there are one or more processors and one or more memories.

Optionally, the memory may be integrated into the processor, or the memory and the processor are separately disposed.

Optionally, the communications device further includes a transmitter (transmitter) and a receiver (receiver).

According to a ninth aspect, a computer program product is provided. The computer program product includes a computer program (which may also be referred to as code or an instruction). When the computer program is run, a computer is enabled to perform the method according to any one of the possible implementations of the first aspect to the sixth aspect.

According to a tenth aspect, a computer-readable medium is provided. The computer-readable medium stores a computer program (which may also be referred to as code or an instruction). When the computer program is run on a computer, the computer is enabled to perform the method according to any one of the possible implementations of the first aspect to the sixth aspect.

According to an eleventh aspect, a chip system is provided. The chip system includes a memory and a processor. The memory is configured to store a computer program. The processor is configured to invoke the computer program from the memory and run the computer program, so that a communications device on which the chip system is installed performs the method according to any one of the possible implementations of the first aspect to the sixth aspect.

The chip system may include an input circuit or interface configured to send information or data, and an output circuit or interface configured to receive information or data.

DESCRIPTION OF EMBODIMENTS

The following describes technical solutions in this application with reference to accompanying drawings.

Figure 1:
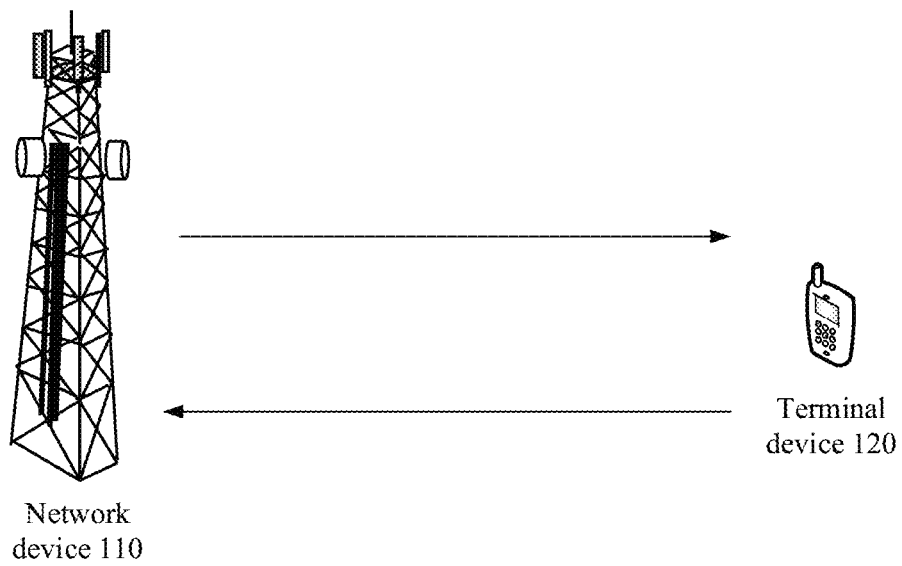
FIG. 1 is a schematic diagram of a communications system according to an embodiment of this application.

FIG. 1 shows a communications system 100 to which this application is applicable. The communications system 100 includes a network device 110 and a terminal device 120. The network device 110 and the terminal device 120 communicate with each other through a wireless network. When the terminal device 120 sends data, a wireless communications module may encode information for transmission. Specifically, the wireless communications module may obtain a quantity of information bits to be sent to the network device 110 through a channel. The information bits are, for example, information bits generated by a processing module, received from another device, or stored in a storage module.

When transmission of the communications system 100 is uplink transmission, the terminal device 120 is a transmit end, and the network device 110 is a receive end. When transmission of the communications system 100 is downlink transmission, the network device 110 is a transmit end, and the terminal device 120 is a receive end.

The technical solutions provided in this application may be applied to various communications systems, for example, a 5G mobile communications system. The 5G mobile communications system in this application includes a non-standalone (non-standalone, NSA) 5G mobile communications system and/or a standalone (standalone, SA) 5G mobile communications system. The technical solutions provided in this application may be further applied to a future communications system such as a sixth generation mobile communications system.

A terminal in this application may be referred to as a terminal device, an access terminal, user equipment (user equipment, UE), a subscriber unit, a subscriber station, a mobile station, a mobile station, a remote station, a remote terminal, a mobile device, a user terminal, a terminal, a wireless communications device, a user agent, or a user apparatus. The access terminal may be a cellular phone, a handheld device having a wireless communication function, a computing device, another processing device connected to a wireless modem, a vehicle-mounted device, a wearable device, or user equipment in a 5G communications system.

The network device may be a base transceiver station (base transceiver station, BTS) in a code division multiple access (code division multiple access, CDMA) system, a NodeB (node B, NB) in a wideband code division multiple access (wideband code division multiple access, WCDMA) system, an evolved NodeB (evolutional node B, eNB) in a long term evolution (long term evolution, LTE) system, or a gNB (gNB) in the 5G mobile communications system. The foregoing base stations are only used as examples for description. Alternatively, the network device may be a relay station, an access point, a vehicle-mounted device, a wearable device, or another type of device.

The foregoing communications system to which this application is applicable is merely an example for description, and a communications system to which this application is applicable is not limited thereto. For example, the communications system may include another quantity of network devices and another quantity of terminal devices.

For ease of understanding of this application, before a communication method provided in this application is described, concepts in this application are briefly described first.

1. Initial BWP

A BWP used when a terminal device initially accesses a cell or a wideband carrier from an RRC-idle mode is referred to as an initial BWP (initial BWP). Alternatively, it may be understood that a terminal device performs random access in an initial BWP.

2. Active (Active) BWP

When a service arrives at the terminal device, a network device schedules the terminal device from the initial BWP to a BWP in which bandwidth matches the service of the terminal device, and may indicate, by using higher layer signaling or layer 1 signaling, the BWP in which the terminal device currently works. The network device and the terminal device may send and receive data and/or a reference signal in the BWP. The BWP is referred to as an active BWP. In a case of a single carrier or one serving cell, one terminal device has only one active BWP at a same moment, and the terminal device only can receive data/a reference signal or send data/a reference signal in the active BWP.

Currently, dynamic switching of a BWP is supported in a communications system. The network device indicates, by using downlink control information (downlink control information, DCI) or radio resource control (radio resource control, RRC) signaling, the terminal device to perform BWP switching. The DCI is located in a current BWP, and a size of a frequency domain resource allocation information field of the DCI is determined by using bandwidth in the current BWP. There is a bandwidth part indicator (bandwidth part indicator) information field in the DCI, and the information field is used to indicate an ID number of a BWP activated by the terminal device. When an ID number, indicated by using the information field, of a BWP is inconsistent with an ID number of a BWP (namely, a current BWP for transmitting the DCI) currently activated by the terminal device, the terminal device needs to switch from the current BWP to the BWP indicated in the DCI.

3. QCL Information

QCL information is used to indicate a QCL relationship between two reference signals. A target reference signal may be usually a demodulation reference signal (demodulation reference signal, DMRS), a channel state information reference signal (channel state information reference signal, CSI-RS), or the like. A referenced reference signal or a source reference signal may be usually a channel state information reference signal (channel state information reference signal, CSI-RS), a tracking reference signal (tracking reference signal, TRS), a synchronization signal/physical broadcast channel block (synchronization signal/PBCH block, SSB), or the like. It should be understood that spatial characteristic parameters of two reference signals or channels that satisfy a QCL relationship are the same, so that a spatial characteristic parameter of the target reference signal can be inferred based on a resource index of the source reference signal. A spatial characteristic parameter includes one or more of the following parameters:

an angle of arrival (angle of arrival, AoA), a dominant (Dominant) angle of arrival AoA, an average angle of arrival, a power angular spectrum (power angular spectrum, PAS) of the angle of arrival, an angle of departure (angle of departure, AoD), a dominant angle of departure, an average angle of departure, a power angular spectrum of the angle of departure, terminal transmit beamforming, terminal receive beamforming, spatial channel correlation, base station transmit beamforming, base station receive beamforming, an average channel gain, an average delay (average delay), a delay spread (delay spread), a Doppler spread (Doppler spread), a Doppler shift (Doppler shift), a spatial reception parameter (spatial Rx parameters), and the like.

It should be understood that the terminal may receive the target reference signal based on receive beam information of the source reference signal indicated by using the QCL information.

4. Transmission Configuration Indicator (Transmission Configuration Indicator, TCI) State A TCI state (TCI state) may include one or two referenced reference signals and an associated QCL type (QCL type). The QCL type may be classified into four categories: A, B, C, and D that are respectively different combinations or selections of {Doppler shift, Doppler spread, average delay, delay spread, and Spatial Rx parameter}. The TCI state includes the QCL information, or the TCI state is used to indicate QCL information.

5. Control-Resource Set (Control Resource Set, CORESET)

To improve efficiency of blindly detecting a control channel by the terminal device, the concept of a CORESET is proposed in an NR standard formulation process. The network device may configure one or more CORESETs for the terminal, where the one or more CORESETs are used to send a PDCCH. The network device may send a control channel to the terminal device on any CORESET corresponding to the terminal device. In addition, the network device further needs to notify the terminal device of another configuration, for example, search space, associated with the CORESET. Configuration information of each CORESET is different in terms of, for example, a frequency domain width and a time domain length.

The dynamic switching of the BWP is supported in the current standard. BWP switching may be performed on a same carrier or between different carriers. How the terminal receives, after the terminal switches from a BWP to another BWP, a physical PDCCH and a PDSCH in the BWP that is after the switching is not involved in the prior art.

In view of this, this application provides a communication method. A network device and a terminal device determine a first BWP and a second BWP, and may determine a first QCL relationship based on an association relationship between the first BWP and the second BWP, to transmit a PDSCH in the second BWP based on the first QCL relationship; and/or a network device and a terminal device may determine a second QCL relationship based on an association relationship between a first BWP and a second BWP, to transmit a PDCCH in the second BWP based on the second QCL relationship. The following describes in detail the communication method provided in this application.

The method in embodiments of this application may be performed by a transmit end and/or a receive end. The transmit end may be the terminal or a chip or a function module that can implement a function of the transmit end, and the receive end may be the network device or a chip or a function module that can implement a function of the receive end. The following describes in detail, by using an example in which the transmit end is the terminal and the receive end is the network device, the communication method provided in this application.

Figure 2:
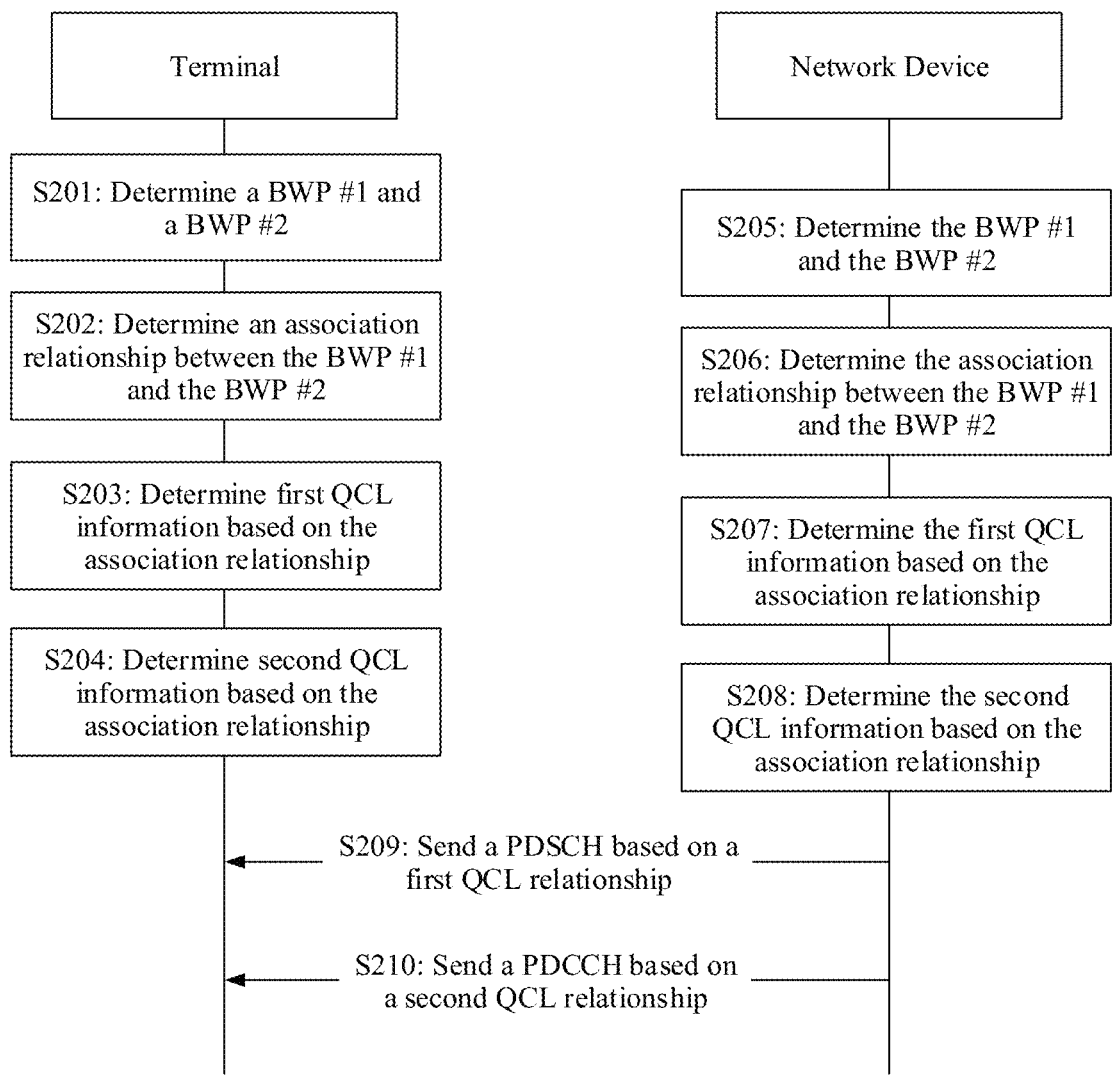
FIG. 2 is a schematic flowchart of a communication method according to an embodiment of this application.

FIG. 2 is a schematic diagram of a communication method according to this application. As shown in FIG. 2, the method mainly includes S210 to S210.

S201: A terminal determines a first BWP BWP #1 and a second BWP BWP #2.

For example, when a network device needs to perform BWP switching, the network device needs to determine a BWP before the switching and a BWP after the switching. If a currently active BWP is the BWP #1, the BWP before the switching is the BWP #1. The BWP #2 may be the BWP after the switching. Then, the network device may send BWP switching indication information to the terminal, to indicate the terminal to switch from the BWP #1 to the BWP #2. The terminal may switch from the BWP #1 to the BWP #2 based on the BWP switching indication information.

The BWP #1 and the BWP #2 may be on one carrier, or may be on a plurality of carriers. For example, the BWP #1 may be configured on a carrier #1, and the BWP #2 may be configured on a carrier #2. The carrier #1 and the carrier #2 may be two carriers on which carrier switching is performed.

For another example, the terminal may access a plurality of carriers, and one BWP may be configured for each carrier. To be specific, there may be a plurality of active BWPs. The BWP #1 may be a BWP for which QCL information has been configured and that is in the plurality of active BWPs, and the BWP #2 may be a BWP for which no QCL information has been configured and that is in the plurality of active BWPs.

S202: The terminal determines an association relationship between the BWP #1 and the BWP #2.

S203: The terminal determines a first QCL relationship based on the association relationship.

S204: The terminal determines a second QCL relationship based on the association relationship.

S205: The network device determines the BWP #1 and the BWP #2.

S206: The network device determines the association relationship between the BWP #1 and the BWP #2.

S207: The network device determines the first QCL relationship based on the association relationship.

S208: The network device determines the second QCL relationship based on the association relationship.

S209: The terminal receives, in the BWP #2 based on the first QCL relationship, a PDSCH sent by the network device.

S210: The terminal receives, in the BWP #2 based on the second QCL relationship, a PDCCH sent by the network device.

It should be understood that S205 corresponds to S201. For details, refer to the description of S210. Details are not described herein again. S202 corresponds to S206. When either of S202 and S206 is performed, the other step is also performed. S203 corresponds to S207. When either of S203 and S207 is performed, the other step is also performed, and the first QCL relationship in the two steps is the same. S204 corresponds to S208. When either of S204 and S208 is performed, the other step is also performed, and the second QCL relationship in the two steps is the same. Both S209 and S210 may be performed, or either of S209 and S210 may be performed. When S203 and S207 are performed, the terminal may perform S209. When S204 and S208 are performed, the terminal may perform S210.

Optionally, S202 may be replaced with S202a: Determine whether there is the association relationship between the BWP #1 and the BWP #2.

Optionally, the terminal may not perform S202. In this case, S203 may be replaced with 203a: The terminal determines the first QCL relationship. Correspondingly, the network device may not perform S206. In this case, S207 is replaced with 207a: The network device determines the first QCL relationship.

Optionally, the terminal may not perform S202. In this case, S204 may be replaced with 204a: The terminal determines the second QCL relationship. Correspondingly, the network device may not perform S208. In this case, S208 is replaced with 208a: The network device determines the first QCL relationship.

It should be understood that a sequence of the steps or simultaneous execution of some steps is not limited in the present invention. For example, a sequence of S203 and S204 may be changed, a sequence of S207 and S208 may be changed, and a sequence of S209 and S210 may be changed.

Specifically, in an embodiment of this application, after determining the BWP #1 and the BWP #2, the terminal determines the association relationship between the BWP #1 and the BWP #2, and determines the first QCL relationship and/or the second QCL relationship based on the association relationship. When the terminal determines the first QCL relationship, the terminal sends a PDSCH based on the first QCL relationship. When the terminal determines the second QCL relationship, the terminal sends a PDCCH based on the first QCL relationship. In an embodiment of this application, after determining the BWP #1 and the BWP #2, the terminal determines the first QCL relationship and/or determines the second QCL relationship. When the terminal determines the first QCL relationship, the terminal sends a PDSCH based on the first QCL relationship. When the terminal determines the second QCL relationship, the terminal sends a PDCCH based on the second QCL relationship. In another embodiment of this application, after determining the BWP #1 and the BWP #2, the terminal determines whether there is the association relationship between the BWP #1 and the BWP #2, and determines the first QCL relationship and/or the second QCL relationship depending on whether there is the association relationship between the BWP #1 and the BWP #2. When the terminal determines the first QCL relationship, the terminal sends a PDSCH based on the first QCL relationship. When the terminal determines the second QCL relationship, the terminal sends a PDCCH based on the first QCL relationship.

In the foregoing description, the first QCL relationship may be specific QCL information or indicated by using the QCL information. The QCL information may be configured by the network device for the terminal by using signaling, or the terminal may assume, based on a preset condition, that some parameters of the BWP #2 and some parameters of the BWP #1 are QCL or have some association relationships. For example, the network device may indicate a TCI state of the PDSCH or the PDCCH by using signaling. The TCI state is used to indicate that a DMRS for the PDSCH or the PDCCH and a reference signal included in the TCI state satisfy a QCL relationship. Alternatively, it may be assumed in a predefined manner that a DMRS for the PDSCH or the PDCCH and a reference signal (for example, an SSB) satisfy a (spatial) QCL relationship. For the second QCL relationship, refer to the description of the first QCL relationship.

It should be understood that the association relationship may include a plurality of association relationships such as a first association relationship or a second association relationship. For example, the association relationship may mean that there are some relationships between some parameters of the BWP #1 and the BWP #2. The relationship may be determined by the terminal based on related information, or may be predefined. The terminal may consider, based on some parameters of the BWP #1 and the BWP #2, there is the/no association relationship between the BWP #1 and the BWP #2. Alternatively, the relationship may be configured by the network device by using signaling. The signaling may be RRC signaling, MAC-CE signaling, DCI, or the like.

In this application, optionally, the PDCCH may be replaced with a PUCCH, and the PDSCH may be replaced with a PUSCH. In other words, the first QCL relationship may be used to transmit the PUSCH, and the second QCL relationship may be used to transmit the PUCCH.

It should be understood that when this application is applied to transmission of an uplink signal or channel, the "QCL relationship" may be replaced with "spatial relation information", or may be replaced with a "TCI" used for uplink transmission.

Optionally, the first QCL relationship may be the same as or different from the second QCL relationship. This is not limited in this application.

Optionally, the terminal may receive the PDSCH based on the first QCL relationship and/or receive the PDCCH based on the second QCL relationship in the following case:

before the terminal receives QCL information of a CORESET and/or the PDSCH in the BWP #2.

In other words, before the network device configures the QCL information of the CORESET and/or the PDSCH in the BWP #2, the terminal may receive the PDSCH based on the first QCL relationship and/or receive the PDCCH based on the second QCL relationship.

According to the communication method in this embodiment of this application, after determining the BWP #1 and the BWP #2, the network device and the terminal device can determine the first QCL relationship and/or the second QCL relationship based on the association relationship between the BWP #1 and the BWP #2, transmit the PDSCH in the BWP #2 based on the first QCL relationship, and transmit the PDCCH in the BWP #2 based on the second QCL relationship.

Optionally, the first QCL relationship and the second QCL relationship may be indicated by using the QCL information configured by the network device for the BWP #1.

Therefore, according to the communication method in this embodiment of this application, the terminal and the network device may transmit the PDCCH and/or the PDSCH in the BWP #2 by reusing QCL information of the BWP #1 and with no need to configure the QCL information after the network device performs beam training, so that a delay problem caused by the beam training can be alleviated. In addition, the network device and the terminal device can align QCL assumptions or beams (a transmit beam and a receive beam) by reusing the QCL information of the BWP #1, so that the terminal can accurately receive data, and signaling overheads required for configuring the QCL information by the network device for the BWP #2 can be reduced.

Further, if the BWP #1 and the BWP #2 satisfy at least one of the following conditions, it may be considered that there is the association relationship between the BWP #1 and the BWP #2 or the BWP #1 and the BWP #2 have the association relationship. In other words, the association relationship between the BWP #1 and the BWP #2 may be at least one of the following conditions 1.

Condition 1:

The BWP #1 and the BWP #2 overlap in frequency domain. It should be understood that, that the BWP #1 and the BWP #2 overlap in frequency domain may alternatively be understood as that the BWP #1 and the BWP #2 include a same resource block (resource block, RB).

That the BWP #1 and the BWP #2 overlap in frequency domain may be any one of the following four cases: A, B, C, and D.

Figure 3:
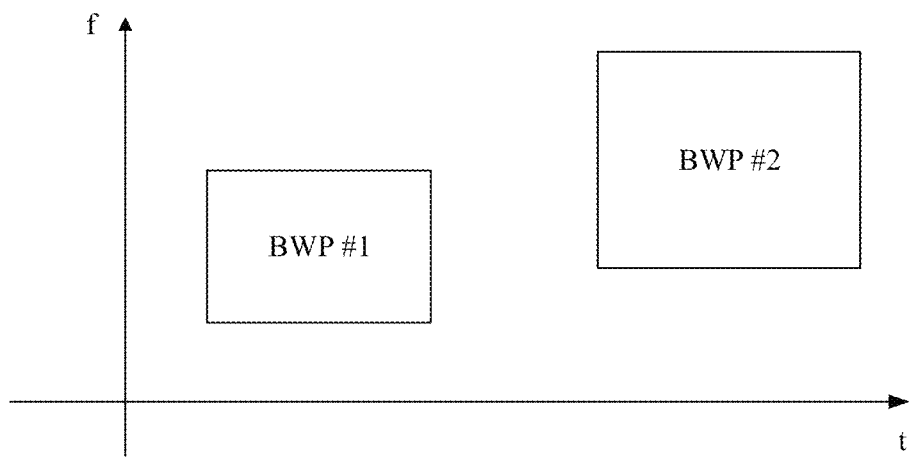
FIG. 3 is a schematic diagram of a relationship between two BWPs in frequency domain according to an embodiment of this application.

A: The BWP #1 and the BWP #2 partially overlap in frequency domain, and there is no inclusion relationship between the BWP #1 and the BWP #2. To be specific, the BWP #1 and the BWP #2 include the same RB, but the BWP #1 is not a subset of the BWP #2, and the BWP #2 is also not a subset of the BWP #1, for example, as shown in FIG. 3.

Figure 4:
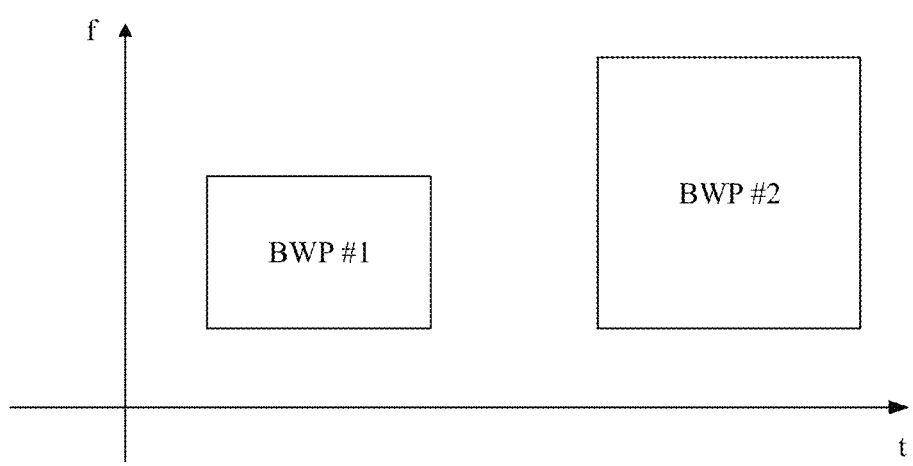
FIG. 4 is a schematic diagram of a relationship between two BWPs in frequency domain according to an embodiment of this application.

B: The BWP #1 is a proper subset of the BWP #2. To be specific, the BWP #2 includes all RBs included in the BWP #1, and at least one of all RBs included in the BWP #2 is different from the RBs included in the BWP #1, for example, as shown in FIG. 4.

Figure 5:
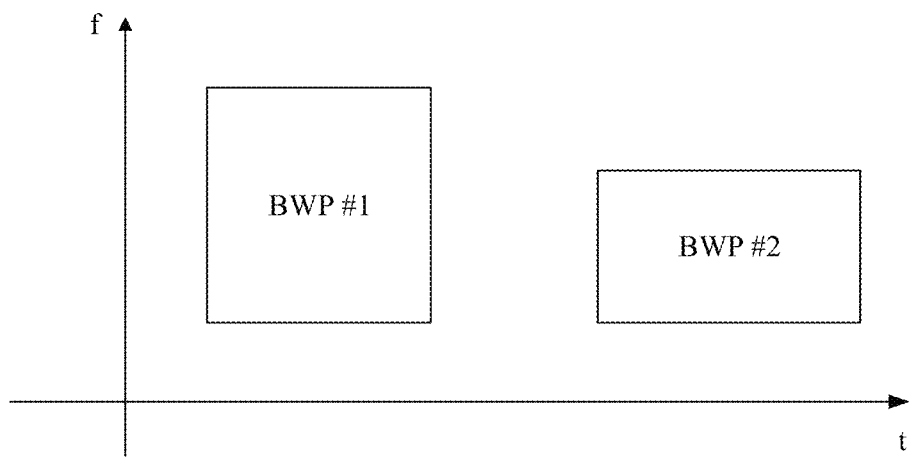
FIG. 5 is a schematic diagram of a relationship between two BWPs in frequency domain according to an embodiment of this application.

C: The BWP #2 is a proper subset of the BWP #1. To be specific, the BWP #1 includes all RBs included in the BWP #2, and at least one of all RBs included in the BWP #1 is different from the RBs included in the BWP #2, for example, as shown in FIG. 5.

Figure 6:
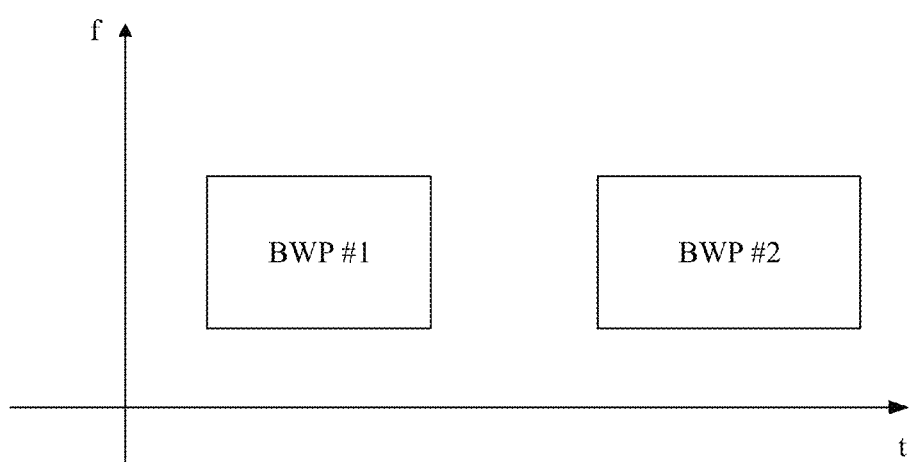
FIG. 6 is a schematic diagram of a relationship between two BWPs in frequency domain according to an embodiment of this application.

D: The BWP #2 and the BWP #1 completely overlap. To be specific, RBs included in the BWP #2 and the BWP #1 are the same, for example, as shown in FIG. 6. In this case, some parameters of the BWP #1 and the BWP #2 may be different. For example, subcarrier spacings of the BWP #1 and the BWP #2 may be different, and CORESETs configured for the BWP #1 and the BWP #2 may be different.

Condition 2:

The BWP #1 and the BWP #2 include a same CORESET.

In other words, the BWP #1 and the BWP #2 overlap in frequency domain, and at least one CORESET configured by the network device in an overlapping area that is of the BWP #1 and the BWP #2 and that is in the BWP #1 is partially or completely the same as at least one CORESET configured by the device in an overlapping area that is of the BWP #1 and the BWP #2 and that is in the BWP #2.

Figure 7:
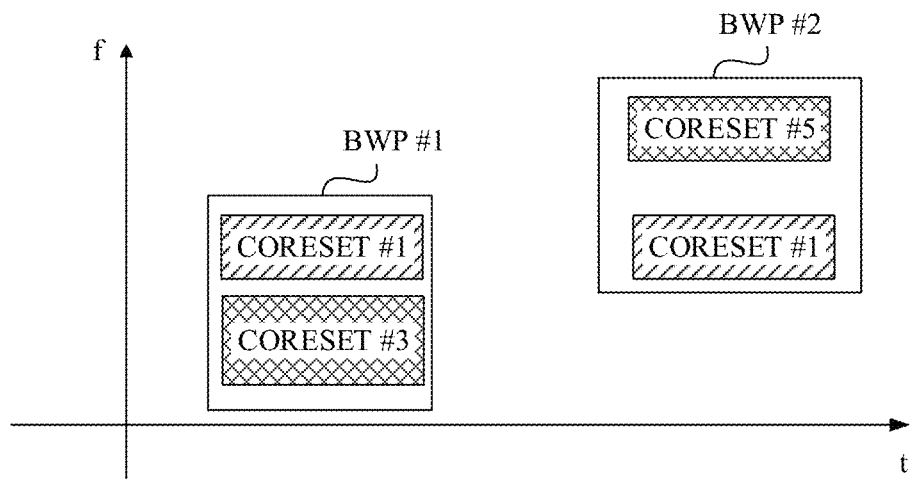
FIG. 7 is a schematic diagram of two BWPs according to an embodiment of this application.

For example, referring to FIG. 7, the BWP #1 and the BWP #2 partially overlap in frequency domain, and the network device configures a CORESET #1 in the overlapping area that is of the BWP #1 and the BWP #2 and that is in the BWP #1, and configures a CORESET #1 in the overlapping area that is of the BWP #1 and the BWP #2 and that is in the BWP #2. In addition, the BWP #2 may further include another CORESET, for example, a CORESET #5 shown in FIG. 7. The BWP #1 may further include another CORESET, for example, a CORESET #3 shown in FIG. 7.

Condition 3:

A reference signal configured by the network device for the BWP #1 and a reference signal configured by the network device for the BWP #2 satisfy a QCL relationship.

Specifically, a reference signal indicated by using QCL information configured by the network device for a CORESET and/or a PDSCH included in the BWP #1 includes the reference signal of the BWP #2. Alternatively, a reference signal indicated by using QCL information configured by the network device for the reference signal included in the BWP #1 is the reference signal of the BWP #2. For example, if a TCI state configured by the network device for the CORESET #1 in the BWP #1 includes a reference signal CSI-RS #1, and the CSI-RS #1 is the reference signal of the BWP #2, it is considered that there is the association relationship between the BWP #1 and the BWP #2.

Alternatively, a reference signal indicated by using QCL information configured by the network device for a CORESET and/or a PDSCH included in the BWP #2 includes the reference signal of the BWP #1. Alternatively, a reference signal indicated by using QCL information configured by the network device for the reference signal included in the BWP #2 is the reference signal of the BWP #1. For example, if a TCI state configured by the network device for a CORESET #2 in the BWP #2 includes a reference signal CSI-RS #2, and the CSI-RS #2 is the reference signal of the BWP #1, it is considered that there is the association relationship between the BWP #1 and the BWP #2.

Condition 4:

The BWP #1 and the BWP #2 are intra-band BWPs, namely, intra-band BWPs.

Being intra-band means being in a same band, and is mainly applied to a multicarrier aggregation scenario in which one terminal device transmits data on two intra-band carriers.

That the BWP #1 and the BWP #2 satisfy at least one of the foregoing conditions may also be referred to as that the BWP #1 and the BWP #2 are QCL or satisfy a QCL assumption relationship. In other words, the association relationship may be the QCL assumption relationship. Correspondingly, that the BWP #1 and the BWP #2 do not satisfy any one of the foregoing conditions may also be referred to as that the BWP #1 and the BWP #2 are not QCL or do not satisfy the QCL assumption relationship.

It should be understood that, in addition to the foregoing conditions, the association relationship between the BWP #1 and the BWP #2 may alternatively be an association relationship configured by the network device, an association relationship reported by the terminal device, or the like.

In this application, the PDSCH and the BWP #1 satisfy a scheduling relationship. In an embodiment, the PDSCH may be associated with a PDCCH in the BWP #1. In a specific embodiment, the PDCCH located in the BWP #1 is used to schedule the PDSCH (namely, a scenario 1). Alternatively, the PDSCH and the BWP #2 satisfy a scheduling relationship. In an embodiment, the PDSCH may be associated with a PDCCH in the BWP #2. In a specific embodiment, the PDCCH located in the BWP #2 is used to schedule the PDSCH (namely, a scenario 2). It should be noted that the second QCL relationship described in the following scenario 2 is a QCL relationship for the PDCCH in the BWP #2.

Scenario 1

In a possible implementation, the first QCL relationship may be at least one of QCL information in (a1) to (a7) below or indicated by using at least one of QCL information in (a1) to (a7) below. Descriptions are separately provided below.

(a1) QCL information included in DCI. The DCI further includes the BWP switching indication information.

It should be understood that the DCI is located in the BWP #1. In other words, the QCL information included in the DCI located in the BWP #1 and used to indicate BWP switching is the first QCL relationship.

Optionally, the QCL information included in the DCI may be one piece of candidate QCL information configured for the BWP #1. In this way, the terminal and the network device may transmit the PDCCH and/or the PDSCH in the second BWP by reusing QCL information of the first BWP and with no need to configure the QCL information after the network device performs beam training, so that a delay problem caused by the beam training can be alleviated. In addition, the network device and the terminal device can align QCL assumptions or beams (a transmit beam and a receive beam) by reusing the QCL information of the first BWP, so that the terminal can accurately receive data, and signaling overheads required for configuring the QCL information by the network device for the second BWP can be reduced.

It should be understood that the DCI may alternatively be one piece of candidate QCL information configured for the BWP #2. This is not limited in this application.

Further, when a scheduling offset is greater than or equal to a first threshold, the first QCL relationship may be QCL information included in DCI used to indicate the BWP switching.

In this application, the scheduling offset is a time offset between the downlink DCI and the PDSCH.

For example, the first threshold may be reported by the terminal based on a capability of the terminal, may be configured by the network device, or may be predefined. In a case of cross-BWP scheduling, for example, when DCI in the BWP #1 is used to schedule the PDSCH in the BWP #2, the first threshold is a sum of time required for beam switching and the BWP switching. In a case of scheduling in a same BWP, for example, when DCI in the BWP #2 is used to schedule the PDSCH in the BWP #2, the first threshold is a time required for beam switching.

(a2) QCL information of a CORESET with a smallest index or identifier in CORESETs included in the BWP #1 or the BWP #2 or a CORESET with a smallest index or identifier in CORESETs for which valid QCL information is configured in the BWP #1 or the BWP #2.

Specifically, one or more CORESETs are configured in the BWP #1, and QCL information of a CORESET with a smallest index or identifier in the one or more CORESETs may be used as the first QCL relationship. Alternatively, one or more CORESETs are configured in the BWP #2, and QCL information of a CORESET with a smallest index or identifier in the one or more CORESETs may be used as the first QCL relationship. For example, referring to FIG. 7, if the network device configures only the CORESET #1 and the CORESET #3 for the BWP #1, and configures only the CORESET #5 and the CORESET #1 for the BWP #2, QCL information of the CORESET #1 in the BWP #1 may be used as the first QCL relationship, or QCL information of the CORESET #5 in the BWP #2 may be used as the first QCL relationship.

Alternatively, one or more CORESETs are configured in the BWP #1 or the BWP #2, but corresponding QCL information is configured for only some of the CORESETs. In this case, QCL information of a CORESET with a smallest CORESET index or identifier in the some of the CORESETs may be used as the first QCL relationship.

Optionally, the CORESET with the smallest identifier or index may be a CORESET with a smallest identifier value or index value in resources for sending a broadcast PDCCH, or a CORESET with a smallest identifier value or index value in resources for sending a non-broadcast PDCCH.

A beam corresponding to a CORESET on which the broadcast PDCCH is sent is usually wider, robustness of the beam is better, and coverage of the beam is larger. Therefore, the network device sends the PDSCH by using the beam corresponding to the CORESET on which the broadcast PDCCH is sent, so that a receiving success rate of the terminal can be improved. A beam corresponding to a CORESET on which the non-broadcast PDCCH is sent is usually narrower, and a peak rate is high. Therefore, the network device sends the PDSCH by using the beam corresponding to the CORESET on which the non-broadcast PDCCH is sent, so that receiving accuracy of the terminal can be improved.

It should be understood that "QCL information of X" described in this application may be understood as QCL information corresponding to X, QCL information used for X, or QCL information applied to X. X may be a CORESET, a PDSCH, an SSB, or the like.

(a3) QCL information of a CORESET included in both the BWP #1 and the BWP #2.

For example, referring to FIG. 7, both the BWP #1 and the BWP #2 include the CORESET #1. In this case, QCL information of the CORESET #1 may be used as the first QCL relationship.

It should be understood that there may be one or more CORESETs included in both the BWP #1 and the BWP #2. If a plurality of CORESETs are included in both the BWP #1 and the BWP #2, QCL information of any one of the plurality of CORESETs may be used as the first QCL relationship, QCL information of a CORESET with a smallest index or identifier in the plurality of CORESETs may be used as the first QCL relationship, or QCL information of a CORESET with a largest index or identifier in the plurality of CORESETs may be used as the first QCL relationship. This is not specifically limited in this embodiment of this application.

It should be further understood that the CORESET included in both the BWP #1 and the BWP #2 indicates a same CORESET included in the BWP #1 and the BWP #2. The same CORESET included in the BWP #1 and the BWP #2 refers to a same time-frequency resource, a same frequency domain resource, or a CORESET with a same identifier or index that is included in the BWP #1 and the BWP #2.

(a4) QCL information of a CORESET included in the BWP #1 in a frequency domain resource on which the BWP #1 and the BWP #2 overlap.

In one manner, the BWP #1 and the BWP #2 overlap in frequency domain, and the network device configures a CORESET set A in an overlapping area of the BWP #1 and the BWP #2 in the BWP #1, and configures a CORESET set B in an overlapping area of BWP #1 and the BWP #2 in the BWP #2. The CORESET set A includes one or more CORESETs, and the CORESET set B includes one or more CORESETs, but the CORESET set A and the CORESET set B have no intersection set. In this case, QCL information of CORESETs in the CORESET set A may be used as the first QCL relationship. For example, QCL information of any CORESET in the CORESET set A may be used as the first QCL relationship, QCL information of a CORESET with a smallest index or identifier in the plurality of CORESETs may be used as the first QCL relationship, or QCL information of a CORESET with a largest index or identifier in the plurality of CORESETs may be used as the first QCL relationship. This is not specifically limited in this embodiment of this application.

In another manner, the BWP #1 and the BWP #2 overlap in frequency domain, and the network device configures a CORESET set A in an overlapping area of the BWP #1 and the BWP #2 in the BWP #1, and configures no CORESET in an overlapping area of the BWP #1 and the BWP #2 in the BWP #2. In this case, QCL information of CORESETs in the CORESET set A may be used as the first QCL relationship. For example, QCL information of any CORESET in the CORESET set A may be used as the first QCL relationship, QCL information of a CORESET with a smallest index or identifier in the plurality of CORESETs may be used as the first QCL relationship, or QCL information of a CORESET with a largest index or identifier in the plurality of CORESETs may be used as the first QCL relationship. This is not specifically limited in this embodiment of this application.

Figure 8:
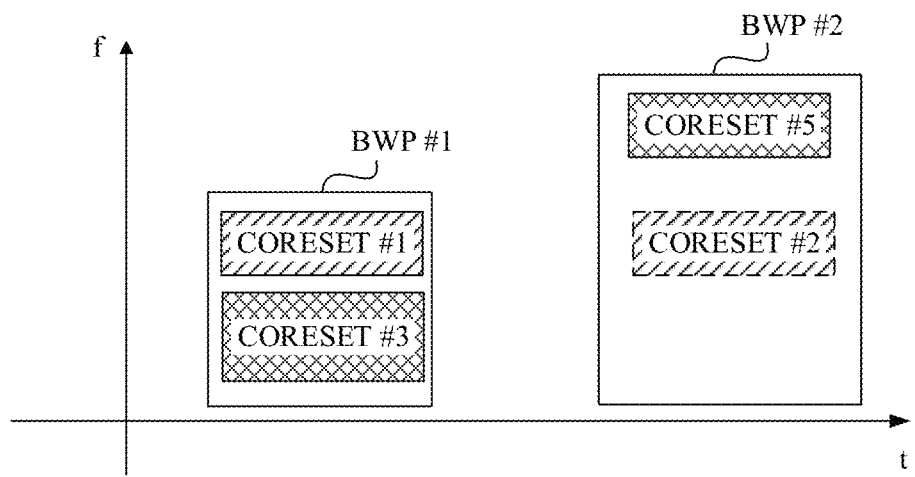
FIG. 8 is a schematic diagram of two BWPs according to an embodiment of this application.

For example, referring to FIG. 8, the BWP #1 and the BWP #2 partially overlap in frequency domain. The network device configures a CORESET #1 and a CORESET #3 in an overlapping area of the BWP #1 and the BWP #2 in the BWP #1, and configures a CORESET #2 in an overlapping area of the BWP #1 and the BWP #2 in the BWP #2. Alternatively, the network device configures a CORESET #1 and a CORESET #3 in an overlapping area of the BWP #1 and the BWP #2 in the BWP #1, and configures no CORESET in an overlapping area of the BWP #1 and the BWP #2 in the BWP #2. In this case, QCL information of the CORESET #1 or the CORESET #3 in the BWP #1 may be used as the first QCL relationship.

(a5) Third QCL information in QCL information configured for a CORESET and/or a PDSCH in the BWP #1, where a reference signal indicated by using the third QCL information is located in the BWP #2, to be specific, the reference signal is located in a band of the BWP #2, or is a resource configured for the BWP #2.

Herein, the QCL information configured for the CORESET in the BWP #1 may be QCL information that is of the CORESET in the BWP #1 and that is configured by using RRC, or may be QCL information that is of the CORESET in the BWP #1 and that is configured/activated by using a MAC-CE. The QCL information configured for the PDSCH in the BWP #1 may be QCL information that is of the PDSCH in the BWP #1 and that is configured by using RRC, may be QCL information that is of the PDSCH in the BWP #1 and that is configured/activated by using a MAC-CE, or may be QCL information that is of the PDSCH in the BWP #1 and that is triggered by using DCI.

For example, if a reference signal CSI-RS #1 indicated by using QCL information #1 (namely, an example of the third QCL information) in the QCL information, configured by using the RRC, of the BWP #1 is located in the BWP #2, the QCL information #1 may be used as the first QCL relationship.

(a6) Fourth QCL information in QCL information configured for a CORESET and/or a PDSCH in the BWP #2, where a reference signal indicated by using the fourth QCL information is located in the BWP #1.

Herein, the QCL information configured for the CORESET in the BWP #2 may be QCL information that is of a CORESET in the BWP #2 and that is configured by using RRC, or may be QCL information that is of a CORESET in the BWP #2 and that is configured/activated by using a MAC-CE. The QCL information configured for the PDSCH in the BWP #2 may be QCL information that is of the PDSCH in the BWP #2 and that is configured by using RRC, may be QCL information that is of the PDSCH in the BWP #2 and that is configured/activated by using a MAC-CE, or may be QCL information that is of the PDSCH in the BWP #2 and that is triggered by using DCI.

For example, if a reference signal CSI-RS #2 indicated by using QCL information #2 (namely, an example of the fourth QCL information) in the QCL information, configured by using the RRC, of the BWP #2 is located in the BWP #1, the QCL information #2 may be used as the first QCL relationship.

(a7) QCL information of a CORESET on which DCI for scheduling the PDSCH is located.

In other words, if DCI #1 in the BWP #1 schedules the PDSCH in the BWP #2, QCL information of a CORESET on which the DCI #1 is located may be used as the first QCL relationship.

In this application, at least one of (a2) to (a7) above may be referred to as default QCL information or default QCL information.

Optionally, regardless of whether there is the association relationship between the BWP #1 and the BWP #2, at least one of (a1) to (a7) above may be used as the first QCL relationship. In another implementation, at least one of (a1) to (a7) above may be used as the first QCL relationship only when there is the association relationship between the BWP #1 and the BWP #2, for example, only when the BWP #1 and the BWP #2 satisfy at least one of the condition 1 to the condition 4 described above.

In another possible implementation, the first QCL relationship may be at least one of QCL information in (b1) to (b5) below or indicated by using at least one of QCL information in (b1) to (b5) below. Descriptions are separately provided below.

(b1) One of pieces of QCL information configured for a CORESET and/or a PDSCH in the BWP #2.

Specifically, one or more pieces of QCL information may be configured for the CORESET in the BWP #2, and any one of the one or more pieces of QCL information may be used as the first QCL relationship. Alternatively, one or more pieces of QCL information may be configured for the PDSCH in the BWP #2, and any one of the one or more pieces of QCL information may be used as the first QCL relationship.

Herein, the QCL information configured for the CORESET in the BWP #2 may be QCL information that is of a CORESET in the BWP #2 and that is configured by using RRC, or may be QCL information that is of a CORESET in the BWP #2 and that is configured/activated by using a MAC-CE. The QCL information configured for the PDSCH in the BWP #2 may be QCL information that is of the PDSCH in the BWP #2 and that is configured by using RRC, may be QCL information that is of the PDSCH in the BWP #2 and that is configured/activated by using a MAC-CE, or may be QCL information that is of the PDSCH in the BWP #2 and that is triggered by using DCI.

For example, if QCL information that is of a CORESET #1 in the BWP #2 and that is configured by using RRC is QCL information #A, QCL information that is of a CORESET #2 in the BWP #2 and that is configured by using the RRC is QCL information #B, and QCL information that is of a CORESET #3 in the BWP #2 and that is configured by using the RRC is QCL information #C, any one of the QCL information #A, the QCL information #B, and the QCL information #C may be used as the first QCL relationship. Alternatively, QCL information of a CORESET with a smallest index or identifier in the plurality of CORESETs is used as the first QCL relationship, or QCL information of a CORESET with a largest index or identifier in the plurality of CORESETs is used as the first QCL relationship.

(b2) QCL information of a synchronization signal/physical broadcast channel block SSB used for initial access.

Optionally, if the BWP #2 is an initial BWP, the BWP #2 includes an initial BWP, or the BWP #2 includes no SSB, the first QCL relationship may be QCL information of an SSB used for initial access.

It should be understood that, that the BWP #2 includes an initial BWP means that the initial BWP is a subset of the BWP #2.

It should be understood that, that the first QCL relationship is QCL information of an SSB for initial access may be understood as that a DMRS for the PDSCH and/or a DMRS for the PDCCH and the SSB satisfy a QCL assumption relationship.

(b3) QCL information used to receive a broadcast PDCCH.

Optionally, if the BWP #2 is an initial BWP, the BWP #2 includes an initial BWP, or the BWP #2 includes no SSB, the first QCL relationship may be QCL information used to receive a broadcast PDCCH.

(b4) QCL information of an SSB with a smallest index in SSBs included in the BWP #2.

An SSB with a smallest index in SSBs included in the BWP #2 may be an SSB with a smallest index value in a plurality of SSBs configured by the network device for the BWP #2, an SSB with a smallest index in a plurality of SSBs measured by the terminal in the BWP #2, or an SSB with a smallest index in a plurality of SSBs, reported by the terminal, in the BWP #2. Optionally, if the BWP #2 includes no initial BWP, and the BWP #2 includes the SSB, the first QCL relationship is QCL information of the SSB with the smallest index in the SSBs included in the BWP #2.

(b5) A reference signal with a smallest index in reference signals used for mobility measurement, in other words, used for radio resource management (Radio Resource Management, RRM), where the reference signal may include an SSB and/or a CSI-RS.

In this application, at least one of (b1) to (b5) above may also be referred to as default QCL information or default QCL information.

Optionally, regardless of whether there is the association relationship between the BWP #1 and the BWP #2, at least one of (b1) to (b5) above may be used as the first QCL relationship. In another implementation, at least one of (b1) to (b5) above may be used as the first QCL relationship only when there is no association relationship between the BWP #1 and the BWP #2, for example, only when the BWP #1 and the BWP #2 do not satisfy any one of the condition 1 to the condition 4 described above.

Optionally, in an embodiment of this application, when the scheduling offset is less than the first threshold, the first QCL relationship may be default QCL information, for example, at least one of (a2) to (a7) or at least one of (b1) to (b5) above.

Scenario 2

1. Second QCL Relationship

In a possible implementation, the second QCL relationship may be at least one of (a2) to (a6) described above. For details, refer to the foregoing description. Details are not described herein again.

In another possible implementation, the first QCL relationship may be (c1) below:

(c1) QCL information of a CORESET that is in the BWP #1 and that is closest to the BWP #2 in frequency domain.

Specifically, there may be two cases: The BWP #1 and the BWP #2 overlap in frequency domain (namely, a case 1), and the BWP #1 and the BWP #2 do not overlap in frequency domain (namely, a case 2).

Case 1

Manner 1: If the BWP #1 and the BWP #2 include a same CORESET, QCL information of the same CORESET in the BWP #1 may be used for a PDCCH on the same CORESET in the BWP #2. For a PDCCH on another frequency domain resource in the BWP #2, QCL information of a CORESET that is in the BWP #1 and that is closest to the PDCCH in frequency domain may be used.

Figure 9:
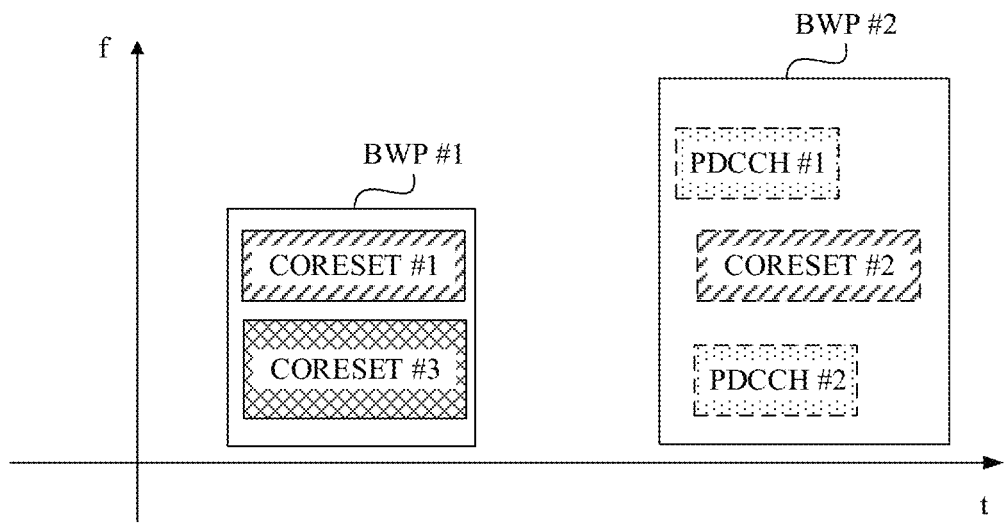
FIG. 9 is a schematic diagram of two BWPs according to an embodiment of this application.

For example, referring to FIG. 9, for a PDCCH on a CORESET #1 in the BWP #2, the second QCL relationship may be QCL information of a CORESET #1 in the BWP #1. For a PDCCH #1 in the BWP #2, the second QCL relationship may be the QCL information of the CORESET #1 in the BWP #1. For a PDCCH #2 in the BWP #2, the second QCL relationship may be QCL information of a CORESET #3 in the BWP #1.

Manner 2: The BWP #1 and the BWP #2 overlap in frequency domain, but the BWP #1 and the BWP #2 do not have a same CORESET. Therefore, for a PDCCH in the BWP #2, QCL information of a CORESET on an overlapping resource in the BWP #1 may be used. For a PDCCH on another frequency domain resource in the BWP #2, QCL information of a CORESET that is in the BWP #1 and that is closest to the PDCCH in frequency domain may be used.

Figure 10:
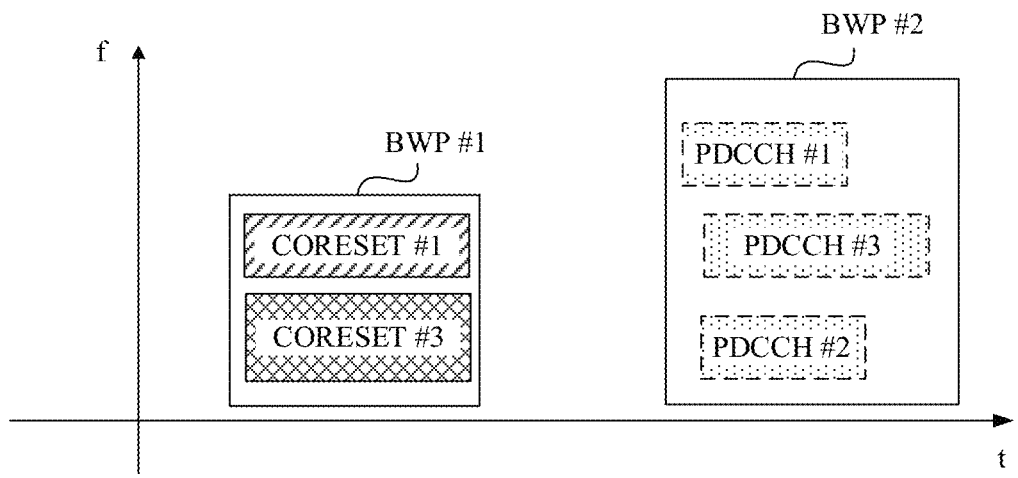
FIG. 10 is a schematic diagram of two BWPs according to an embodiment of this application.

For example, referring to FIG. 10, for a PDCCH #3 in the BWP #2, the second QCL relationship may be QCL information of a CORESET #1 in the BWP #1. For a PDCCH #1 in the BWP #2, the second QCL relationship may be the QCL information of the CORESET #1 in the BWP #1. For a PDCCH #2 in the BWP #2, the second QCL relationship may be QCL information of a CORESET #3 in the BWP #1.

Case 2:

The BWP #1 and the BWP #2 do not overlap in frequency domain. For a PDCCH in the BWP #2, QCL information of a CORESET that is in the BWP #1 and that is closest to the PDCCH in frequency domain may be used.

Figure 11:
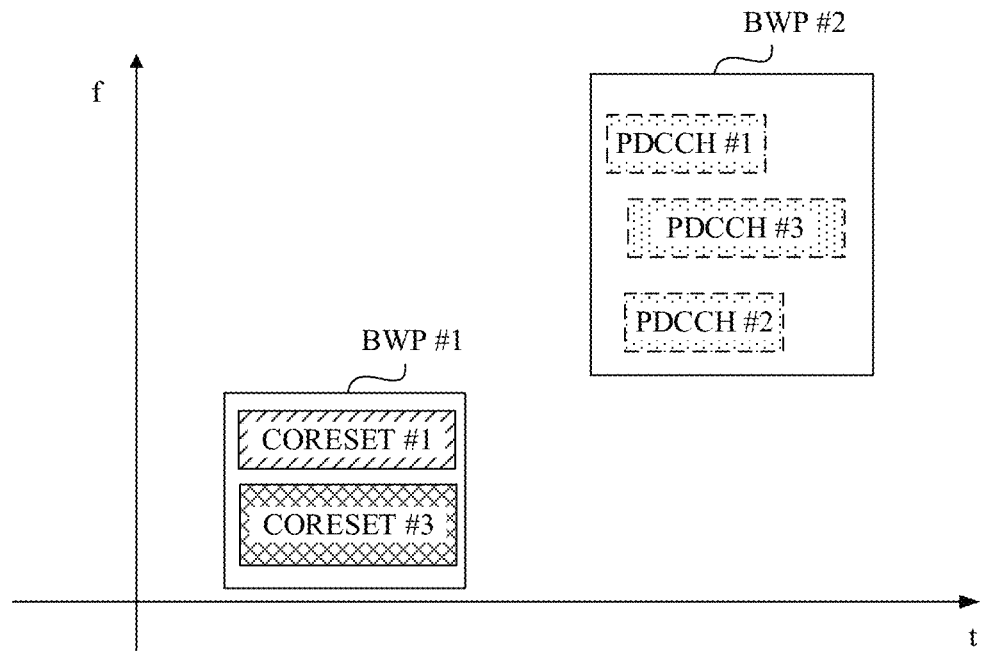
FIG. 11 is a schematic diagram of two BWPs according to an embodiment of this application.

For example, referring to FIG. 11, QCL relationships for a PDCCH #1 to a PDCCH #3 in a BWP #2 may be QCL information of a CORESET #1 in the BWP #1.

Optionally, regardless of whether there is the association relationship between the BWP #1 and the BWP #2, at least one of (a2) to (a6) and (c1) above may be used as the second QCL relationship. In another implementation, at least one of (a2) to (a6) and (c1) above may be used as the second QCL relationship only when there is the association relationship between the BWP #1 and the BWP #2, for example, only when the BWP #1 and the BWP #2 satisfy any one of the condition 1 to the condition 4 described above.

In another possible implementation, the second QCL information may be at least one of (b1) to (b5) described above. For details, refer to the foregoing description. Details are not described herein again.

Optionally, regardless of whether there is the association relationship between the BWP #1 and the BWP #2, at least one of (b1) to (b5) above may be used as the second QCL relationship. In another implementation, at least one of (b1) to (b5) above may be used as the second QCL relationship only when there is no association relationship between the BWP #1 and the BWP #2, for example, only when the BWP #1 and the BWP #2 do not satisfy any one of the condition 1 to the condition 4 described above.

2. First QCL Relationship

In a possible implementation, the first QCL relationship may be at least one of (a1) to (a7) and (c1) described above. For details, refer to the foregoing description. Details are not described herein again.

Optionally, regardless of whether there is the association relationship between the BWP #1 and the BWP #2, at least one of (b1) to (b5) above may be used as the first QCL relationship. In another implementation, at least one of (a1) to (a7) and (c1) above may be used as the first QCL relationship only when there is the association relationship between the BWP #1 and the BWP #2, for example, only when the BWP #1 and the BWP #2 satisfy any one of the condition 1 to the condition 4 described above.

In a possible implementation, the first QCL information may be at least one of (b1) to (b5) described above. For details, refer to the foregoing description. Details are not described herein again.

Optionally, regardless of whether there is the association relationship between the BWP #1 and the BWP #2, at least one of (b1) to (b5) above may be used as the first QCL relationship. In another implementation, at least one of (b1) to (b5) above may be used as the first QCL relationship only when there is no association relationship between the BWP #1 and the BWP #2, for example, only when the BWP #1 and the BWP #2 do not satisfy any one of the condition 1 to the condition 4 described above.

The foregoing describes in detail, with reference to FIG. 2 to FIG. 11, the communication method provided in this application. The following describes, with reference to FIG. 12, another communication method provided in this application.

Figure 12:
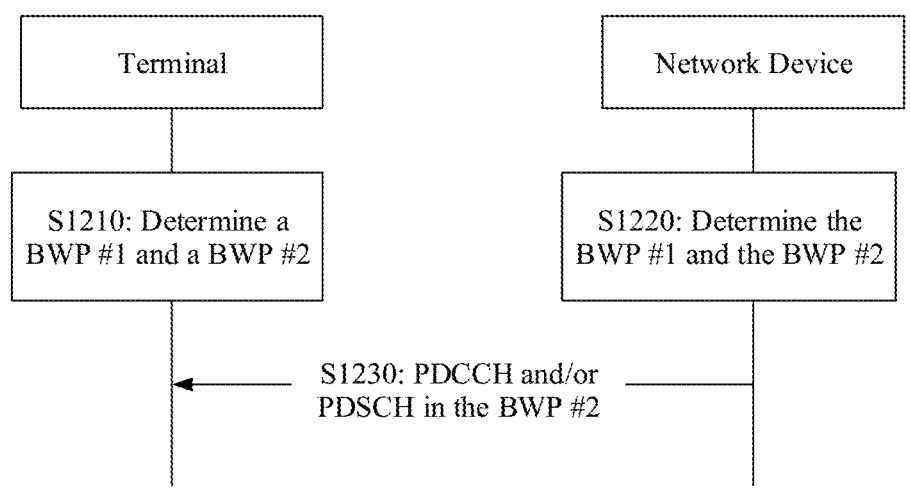
FIG. 12 is a schematic flowchart of another communication method according to an embodiment of this application.

FIG. 12 is a schematic diagram of another communication method according to this application. The following describes in detail the communication method shown in FIG. 12.

S1210: A terminal determines a first BWP BWP #1 and a second BWP BWP #2.

S1220: A network device determines the BWP #1 and the BWP #2.

For example, when the network device needs to perform BWP switching, the network device needs to determine a BWP before the switching and a BWP after the switching. If a currently active BWP is the BWP #1, the BWP before the switching is the BWP #1. The BWP #2 may be the BWP after the switching. Then, the network device may send BWP switching indication information to the terminal, to indicate the terminal to switch from the BWP #1 to the BWP #2. The terminal may switch from the BWP #1 to the BWP #2 based on the BWP switching indication information.

The BWP #1 and the BWP #2 may be on one carrier, or may be on a plurality of carriers. For example, the BWP #1 may be configured on a carrier #1, and the BWP #2 may be configured on a carrier #2. The carrier #1 and the carrier #2 may be two carriers on which carrier switching is performed.

For another example, the terminal may access a plurality of carriers, and one BWP may be configured for each carrier. To be specific, there may be a plurality of active BWPs. The BWP #1 may be a BWP for which QCL information has been configured and that is in the plurality of active BWPs, and the BWP #2 may be a BWP for which no QCL information has been configured and that is in the plurality of active BWPs.

The BWP #1 and the BWP #2 may or may not overlap in frequency domain. That the BWP #1 and the BWP #2 overlap in frequency domain may be any one of the four overlapping cases A to D described above. For details, refer to the foregoing descriptions and FIG. 3 to FIG. 6. Details are not described herein again.

S1230: The terminal receives a PDSCH and/or a PDCCH in the BWP #2 based on a TCI state for the BWP #1. Correspondingly, the network device sends the PDSCH and/or the PDCCH in the BWP #2 based on the TCI state for the BWP #1.

It should be understood that, that the terminal receives a PDSCH and/or a PDCCH in the BWP #2 based on a TCI state for the BWP #1 may also be understood as that the terminal receives the PDSCH and/or the PDCCH in the BWP #2 by reusing the TCI state for the BWP #1. It should be further understood that the TCI state for the BWP #1 is a TCI state configured for a PDCCH and/or a PDSCH in the BWP #1. The TCI state for the BWP #1 may be configured by using RRC signaling, MAC-CE signaling, or DCI.

Further, in a possible implementation of S1230, when there is an association relationship between the BWP #1 and the BWP #2, the terminal may receive the PDSCH and/or the PDCCH in the BWP #2 based on the TCI state for the BWP #1. Correspondingly, when there is the association relationship between the BWP #1 and the BWP #2, the network device may send the PDSCH and/or the PDCCH in the BWP #2 based on the TCI state for the BWP #1.

For understanding of the association relationship, refer to the foregoing description. In addition, for a condition under which there is the association relationship between the BWP #1 and the BWP #2, also refer to the foregoing description. For example, when the BWP #1 and the BWP #2 satisfy at least one of the condition 1 to the condition 4 described above, it may be considered that there is the association relationship between the BWP #1 and the BWP #2 or the BWP #1 and the BWP #2 have the association relationship.

According to the communication method in this embodiment of this application, the terminal can receive the PDCCH and/or the PDSCH in the BWP #2 by using, in advance by reusing the TCI state for the BWP #1 and with no need to configure a TCI state after the network device performs beam training, more accurate QCL information obtained based on dynamic or semi-static signaling, so that a delay problem caused by the beam training can be alleviated. In addition, signaling overheads required for configuring the TCI state by the network device for the BWP #2 can be reduced by reusing the TCI state for the BWP #1.

Optionally, that the terminal receives the PDCCH in the BWP #2 based on the TCI state for the BWP #1 may be specifically any one or any combination of the following several implementations.

Manner 1

The terminal receives the PDCCH in the BWP #2 by using a TCI state that is used for the PDCCH in the BWP #1 and that is indicated by using media access control signaling.

In other words, the terminal receives the PDCCH in the BWP #2 by reusing a TCI state that is activated by using the media access control signaling and that is configured for the PDCCH in the BWP #1. For example, the network device configures eight candidate TCI states, namely, a TCI state #1 to a TCI state #8, for the PDCCH in the BWP #1 by using the RRC signaling. If the network device activates the TCI state #3 in the eight candidate TCI states by using media access control signaling, the terminal may receive the PDCCH in the BWP #2 based on the TCI state #3.

It should be understood that the media access control signaling is sent by the network device in the BWP #1. If a plurality of TCI states are activated by using the media access control signaling, the terminal may use any one of the plurality of TCI states, a TCI state with a smallest index or a largest index, or all TCI states. This is not limited in this embodiment of this application.

It should be noted that the media access control signaling in this application is layer 2 signaling, and may be MAC layer signaling, a MAC-CE, or the like.

In this embodiment of this application, the terminal receives the PDCCH in the BWP #2 by reusing the TCI state that is indicated by using the media access control signaling and that is used for the PDCCH in the BWP #1, so that signaling overheads required for configuring the TCI state by the network device for the BWP #2 can be reduced. In addition, a delay caused when the network device configures the TCI state for the BWP #2 can be reduced.

It should be understood that, the TCI state activated by the network device by using the media access control signaling and configured for the PDCCH in the BWP #1 may be understood as a TCI state activated by the network device by using the media access control signaling and configured for a CORESET in the BWP #1.

Manner 2

The terminal receives media access control signaling. The media access control signaling is used to indicate that one or more of a plurality of candidate TCI states used for the BWP #1 and configured by using the RRC are used to receive the PDCCH in the BWP #2. The terminal receives the PDCCH in the BWP #2 based on the one or more TCI states. The plurality of candidate TCI states used for the BWP #1 are a plurality of candidate TCI states configured for the PDCCH and/or the PDSCH in the BWP #1.

Specifically, the network device may configure the plurality of candidate TCI states, for example, a TCI state #1 to a TCI state #8, for the PDCCH and/or the PDSCH in the BWP #1 by using the RRC signaling. The network device may activate one or more of the plurality of candidate TCI states, for example, the TCI state #1, by using the media access control signaling, and indicate, by using the media access control signaling, that the one or more activated TCI states are used to receive the PDCCH in the BWP #2. To be specific, the TCI state #1 activated by the network device by using the media access control signaling is used to receive the PDCCH in the BWP #2.

It should be understood that the media access control signaling is sent by the network device in the BWP #1, or may be sent by the network device in the BWP #2. This is not limited in this embodiment of this application.

In this embodiment of this application, the terminal receives the PDCCH in the BWP #2 by reusing the TCI state that is indicated by using the RRC signaling and that is used for the PDCCH in the BWP #1, so that signaling overheads required for configuring the TCI state by the network device for the BWP #2 can be reduced. In addition, a delay caused when the network device configures the TCI state for the BWP #2 can be reduced.

It should be noted that the manner 1 is different from the manner 2. In the manner 2, the media access control is used to explicitly indicate that the activated TCI state is used to receive the PDCCH in the BWP #2. In the manner 1, a predefined manner may be used to define: The TCI state activated by using the media access control signaling and used for the BWP #1 is used to receive the PDCCH in the BWP #2. It can be learned that in the manner 1, that the TCI state activated by using the media access control signaling is used to receive the PDCCH in the BWP #2 can be explicitly indicated without signaling.

In addition, optionally, a quantity of bits of a bitmap (bitmap) used for configuring a TCI state and in the media access control signaling in the manner 1 may be different from a quantity of bits of a bitmap used for configuring a TCI state and in the media access control signaling in the manner 2. In this case, the bitmap in the media access control signaling in the manner 2 may activate the first several or the last several TCI states in candidate TCI states configured by using the RRC signaling. This is not specifically limited in this embodiment of this application. For example, if the quantity of bits of the bitmap in the media access control signaling in the manner 1 is 4, and the quantity of bits of the bitmap in the manner 2 is 3, the bitmap in the media access control signaling in the manner 2 may be used to activate the first eight or the last eight TCI states in the 16 candidate TCI states configured by using the RRC signaling.

Manner 3

The terminal receives, based on a TCI state of a CORESET that is in the BWP #1 and that is the same as a CORESET in the BWP #2, a PDCCH on the CORESET that is in the BWP #2 and that is the same as the CORESET in the BWP #1.

In other words, TCI states of same CORESETs in the BWP #1 and the BWP #2 are also the same. For example, referring to FIG. 7, the terminal may receive a PDCCH on a CORESET #1 in the BWP #2 based on a TCI state of a CORESET #1 in the BWP #1.

In this embodiment of this application, the terminal receives the PDCCH in the BWP #2 by reusing a TCI state of a same CORESET, so that signaling overheads required for configuring the TCI state by the network device for the BWP #2 can be reduced. In addition, a delay caused when the network device configures the TCI state for the BWP #2 can be reduced.

It should be understood that, in this application, that two CORESETs are the same may also be that the two CORESETs have same identifiers or indexes. It should be further understood that the manner 3 is applied to a case in which the BWP #1 and the BWP #2 overlap in frequency domain.

Manner 4

The terminal receives, based on a TCI state of a CORESET that is in the BWP #1 and that is the same as a CORESET in the BWP #2, a PDCCH on a CORESET that is in the BWP #2 and that is different from a CORESET in the BWP #1.

Specifically, the BWP #1 and the BWP #2 include same CORESETs, and the BWP #1 and the BWP #2 include different CORESETs. The terminal receives, by using a TCI state of the same CORESET, a PDCCH on a CORESET that is in the BWP #2 and that is different from a CORESET in the BWP #1. For example, referring to FIG. 7, the terminal may receive a PDCCH on a CORESET #5 in the BWP #2 based on a TCI state of a CORESET #1 in the BWP #1.

Optionally, if there are a plurality of same CORESETs in the BWP #1 and the BWP #2, the terminal may receive, based on a TCI state of any one of the plurality of same CORESETs or based on a TCI state of a CORESET with a smallest or largest index in the plurality of same CORESETs, the PDCCH on the CORESET that is in the BWP #2 and that is different from the CORESET in the BWP #1. This is not limited in this embodiment of this application.

It should be understood that the manner 4 is applied to a case in which the BWP #1 and the BWP #2 overlap in frequency domain, and same CORESETs are configured for the BWP #1 and the BWP #2 in an overlapping area.

Manner 5

The terminal receives the PDCCH in the BWP #2 in a manner in which CORESETs in the BWP #2 corresponds to CORESETs in the BWP #1 in ascending order of identifiers or indexes.

In other words, the terminal uses a TCI state of a CORESET with a larger identifier or index in the BWP #1 to receive a PDCCH on a CORESET with a larger identifier or index in the BWP #2, and uses a TCI state of a CORESET with a smaller identifier or index in the BWP #1 to receive a PDCCH on a CORESET with a smaller large identifier or index in the BWP #2.

Specifically, if a quantity of CORESETs included in the BWP #2 is the same as a quantity of CORESETs included in the BWP #1, TCI states of the CORESETs in the BWP #2 correspond one-to-one to TCI states of the CORESETs in the BWP #1 in ascending order of identifiers or the indexes of the CORESETs. For example, the BWP #1 includes a CORESET #1, a CORESET #3, and a CORESET #4, and the BWP #2 includes a CORESET #1, a CORESET #2, and a CORESET #5. In this case, a TCI state of the CORESET #1 in the BWP #2 is the same as a TCI state of the CORESET #1 in the BWP #1, a TCI state of the CORESET #2 in the BWP #2 is the same as a TCI state of the CORESET #3 in the BWP #1, and a TCI state of the CORESET #5 in the BWP #2 is the same as a TCI state of the CORESET #4 in the BWP #1.

If a quantity of CORESETs included in the BWP #1 is greater than a quantity of CORESETs included in the BWP #2, TCI states of N (the quantity of CORESETs included in the BWP #2) CORESETs with smaller identifiers or indexes in the BWP #1 correspond one-to-one to TCI states of the N CORESETs in the BWP #2 in ascending order of identifiers or indexes of the CORESETs. For example, the BWP #1 includes a CORESET #1, a CORESET #3, and a CORESET #4, and the BWP #2 includes a CORESET #1 and a CORESET #2. In this case, a TCI state of the CORESET #1 in the BWP #2 is the same as a TCI state of the CORESET #1 in the BWP #1, and a TCI state of the CORESET #2 in the BWP #2 is the same as a TCI state of the CORESET #3 in the BWP #1.

If a quantity of CORESETs included in the BWP #1 is less than a quantity of CORESETs included in the BWP #2, TCI states of M (the quantity of CORESETs included in the BWP #1) CORESETs with smaller identifiers or indexes in the BWP #2 correspond one-to-one to TCI states of the M CORESETs in the BWP #1 in ascending order of identifiers or indexes of the CORESETs. A TCI state of a remaining CORESET in the BWP #2 is the same as a TCI state of a CORESET with a largest index or identifier in the BWP #1. For example, the BWP #1 includes a CORESET #1 and a CORESET #3, and the BWP #2 includes a CORESET #1, a CORESET #2, and a CORESET #5. In this case, a TCI state of the CORESET #1 in the BWP #2 is the same as a TCI state of the CORESET #1 in the BWP #1, a TCI state of the CORESET #2 in the BWP #2 is the same as a TCI state of the CORESET #3 in the BWP #1, and a TCI state of the CORESET #5 in the BWP #2 is the same as the TCI state of the CORESET #3 in the BWP #1.

In addition, if a quantity of CORESETs included in the BWP #1 is greater than a quantity of CORESETs included in the BWP #2, TCI states of N (the quantity of CORESETs included in the BWP #2) CORESETs with larger identifiers or indexes in the BWP #1 may alternatively be enabled to correspond one-to-one to TCI states of the N CORESETs in the BWP #2 in ascending order of identifiers or indexes of the CORESETs. For example, the BWP #1 includes a CORESET #1, a CORESET #3, and a CORESET #4, and the BWP #2 includes a CORESET #1 and a CORESET #2. In this case, a TCI state of the CORESET #1 in the BWP #2 is the same as a TCI state of the CORESET #3 in the BWP #1, and a TCI state of the CORESET #2 in the BWP #2 is the same as a TCI state of the CORESET #3 in the BWP #1.

If a quantity of CORESETs included in the BWP #1 is less than a quantity of CORESETs included in the BWP #2, TCI states of M (the quantity of CORESETs included in the BWP #1) CORESETs with smaller identifiers or indexes in the BWP #2 may alternatively be enabled to correspond one-to-one to TCI states of the M CORESETs in the BWP #1 in ascending order of identifiers or indexes of the CORESETs. A TCI state of a remaining CORESET in the BWP #2 is the same as a TCI state of a CORESET with a smallest index or identifier in the BWP #1. For example, the BWP #1 includes a CORESET #1 and a CORESET #3, and the BWP #2 includes a CORESET #1, a CORESET #2, and a CORESET #5. In this case, a TCI state of the CORESET #1 in the BWP #2 is the same as a TCI state of the CORESET #1 in the BWP #1, a TCI state of the CORESET #2 in the BWP #2 is the same as a TCI state of the CORESET #3 in the BWP #1, and a TCI state of the CORESET #5 in the BWP #2 is the same as the TCI state of the CORESET #1 in the BWP #1.

Manner 6

The terminal receives DCI. The DCI signaling is used to indicate that one or more of a plurality of candidate TCI states configured by using media access control signaling and used for the BWP #1 are used to receive the PDCCH in the second BWP #2. The terminal receives the PDCCH in the BWP #2 based on the one or more TCI states. The plurality of candidate TCI states for the BWP #1 include a plurality of candidate TCI states configured for the PDCCH and/or the PDSCH in the BWP #1.

Specifically, the network device may configure the plurality of candidate TCI states, for example, a TCI state #1 to a TCI state #8, for the PDCCH and/or the PDSCH in the BWP #1 by using the media access control signaling. The network device may activate one or more of the plurality of candidate TCI states, for example, the TCI state #1, by using the DCI, and indicate, by using the DCI, that the one or more activated TCI states are used to receive the PDCCH in the BWP #2. To be specific, the TCI state #1 activated by the network device by using the DCI signaling is used to receive the PDCCH in the BWP #2.

It should be understood that the DCI may be sent by the network device in the BWP #1, or may be sent by the network device in the BWP #2. If a plurality of TCI states are activated by using the DCI, the terminal may use any one of the plurality of TCI states, a TCI state with a smallest index or a largest index, or the plurality of TCI states. This is not limited in this embodiment of this application.

In this embodiment of this application, the terminal receives the PDCCH in the BWP #2 by reusing the TCI state that is configured by using the media access control signaling and that is used for the PDCCH and/or the PDSCH in the BWP #1, so that signaling overheads required for configuring the TCI state by the network device for the BWP #2 can be reduced.

Manner 7

The terminal receives DCI. The DCI is used to indicate one or more TCI states for the BWP #1. The terminal receives the PDCCH in the BWP #2 by using the one or more TCI states.

Specifically, the network device may indicate the one or more TCI states by using the DCI, for example, a TCI state #1. In this case, the terminal may receive the PDCCH in the BWP #2 by using the TCI state #1.

In this embodiment of this application, the terminal receives the PDCCH in the BWP #2 by reusing the TCI state that is configured by using the DCI signaling and that is used for the PDCCH and/or the PDSCH in the BWP #1, so that signaling overheads required for configuring the TCI state by the network device for the BWP #2 can be reduced.

It should be understood that the DCI may be sent by the network device in the BWP #1, or may be sent by the network device in the BWP #2. If a plurality of TCI states are activated by using the DCI, the terminal may use any one of the plurality of TCI states, a TCI state with a smallest index or a largest index, or the plurality of TCI states. This is not limited in this embodiment of this application.

It should be further understood that the manner 6 is different from the manner 7. In the manner 6, the DCI is used to explicitly indicate that the activated TCI state is used to receive the PDCCH in the BWP #2. In the manner 7, a predefined manner may be used to define: The TCI state activated by using the DCI and used for the BWP #1 is used to receive the PDCCH in the BWP #2. It can be learned that in the manner 7, that the TCI state activated by using the DCI is used to receive the PDCCH in the BWP #2 can be explicitly indicated without signaling.

In addition, a quantity of bits in a TCI field (filed) (used to indicate a TCI state) in the DCI in the manner 6 may be different from a quantity of bits in a TCI field in the DCI in the manner 7. In this case, the TCI field in the DCI in the manner 6 may activate one of the first several or the last several TCI states in candidate TCI states configured by using the media access control signaling. This is not specifically limited in this embodiment of this application. For example, if the quantity of bits in the TCI field in the DCI in the manner 7 is 3, and the quantity of bits in the TCI field in the DCI in the manner 6 is 2, information in the TCI field in the DCI in the manner 6 may be used to activate one of the first four or the last four TCI states in the eight candidate TCI states configured by using the media access control signaling.

Optionally, that the terminal receives the PDSCH in the BWP #2 based on the TCI state for the BWP #1 may be specifically any one or any combination of the following several implementations.

Manner 1

The terminal receives DCI. The DCI signaling is used to indicate that one or more of a plurality of candidate TCI states configured by using media access control signaling or RRC signaling and used for the BWP #1 are used to receive the PDSCH in the second BWP #2. The terminal receives the PDSCH in the BWP #2 based on the one or more TCI states. The plurality of candidate TCI states for the BWP #1 include a plurality of candidate TCI states configured for the PDCCH and/or the PDSCH in the BWP #1.

Specifically, the network device may configure the plurality of candidate TCI states, for example, a TCI state #1 to a TCI state #8, for the PDCCH and/or the PDSCH in the BWP #1 by using the media access control signaling or the RRC signaling. The network device may activate one or more of the plurality of candidate TCI states, for example, the TCI state #1, by using the DCI, and indicate, by using the DCI, that the one or more activated TCI states are used to receive the PDSCH in the BWP #2. To be specific, the TCI state #1 activated by the network device by using the DCI signaling is used to receive the PDSCH in the BWP #2.

It should be understood that the DCI may be sent by the network device in the BWP #1, or may be sent by the network device in the BWP #2. If a plurality of TCI states are activated by using the DCI, the terminal may use any one of the plurality of TCI states, a TCI state with a smallest index or a largest index, or the plurality of TCI states. This is not limited in this embodiment of this application.

In this embodiment of this application, the terminal receives the PDSCH in the BWP #2 by reusing the TCI state that is configured by using the media access control signaling or the RRC signaling and that is used for the PDCCH and/or the PDSCH in the BWP #1, so that signaling overheads required for configuring the TCI state by the network device for the BWP #2 can be reduced. In addition, a delay caused when the network device configures the TCI state for the BWP #2 can be reduced.

Manner 2

The terminal receives media access control signaling. The media access control signaling is used to indicate that one or more of a plurality of candidate TCI states used for the BWP #1 and configured by using the RRC signaling are used to receive the PDSCH in the BWP #2. The terminal receives the PDSCH in the BWP #2 based on the one or more TCI states.

Specifically, the network device may configure the plurality of candidate TCI states, for example, a TCI state #1 to a TCI state #16, for the PDCCH and/or the PDSCH in the BWP #1 by using the RRC signaling. The network device may activate one or more of the plurality of candidate TCI states, for example, the TCI state #1 to the TCI state #4, by using the media access control signaling, and indicate, by using the media access control signaling, that the one or more activated TCI states are used to receive the PDSCH in the BWP #2 or are used as candidate TCI states for receiving the PDSCH in the BWP #2. Optionally, the network device further indicates, by using DCI signaling, that one or more of the TCI state #1 to the TCI state #4, for example, the TCI state #1, are used to receive the PDSCH in the BWP #2. To be specific, the TCI state #1 activated by the network device by using the DCI signaling is used to receive the PDSCH in the BWP #2.

It should be understood that the media access control signaling may be sent by the network device in the BWP #1, or may be sent by the network device in the BWP #2. If a plurality of TCI states are activated by using the media access control signaling, the terminal may use any one of the plurality of TCI states or a TCI state with a smallest index or a largest index. This is not limited in this embodiment of this application.

In this embodiment of this application, the terminal receives the PDSCH in the BWP #2 by reusing the TCI state that is indicated by using the RRC signaling and that is used for the PDCCH and/or the PDSCH in the BWP #1, so that signaling overheads required for configuring the TCI state by the network device for the BWP #2 can be reduced. In addition, a delay caused when the network device configures the TCI state for the BWP #2 can be reduced.

Manner 3

The terminal receives DCI. The DCI is used to indicate one or more TCI states used to receive the PDCCH or the PDSCH in the BWP #1. The terminal receives the PDSCH in the BWP #2 by using the one or more TCI states.

Specifically, the network device may configure one or more candidate TCI states, for example, a TCI state #1 to a TCI state #8, for the PDCCH and/or the PDSCH in the BWP #1 by using the media access control signaling or the RRC signaling. The network device may activate one or more of the one or more candidate TCI states, for example, the TCI state #1, by using the DCI. In this case, the terminal may receive the PDSCH in the BWP #2 by using the activated TCI state #1.

It should be understood that the DCI may be sent by the network device in the BWP #1. If a plurality of TCI states are activated by using the DCI, the terminal may use any one of the plurality of TCI states or a TCI state with a smallest index or a largest index. This is not limited in this embodiment of this application.

It should be further understood that the manner 1 is different from the manner 3. In the manner 1, the DCI is used to explicitly indicate that the activated TCI state is used to receive the PDSCH in the BWP #2. In the manner 3, a predefined manner may be used to define: The TCI state activated by using the DCI and used for the BWP #1 is used to receive the PDSCH in the BWP #2. It can be learned that in the manner 3, that the TCI state activated by using the DCI is used to receive the PDSCH in the BWP #2 can be explicitly indicated without signaling.

In addition, a quantity of bits in a TCI field (filed) (used to indicate a TCI state) in the DCI in the manner 1 may be different from a quantity of bits in a TCI field in the DCI in the manner 3. In this case, the TCI field in the DCI in the manner 1 may activate one of the first several or the last several TCI states in candidate TCI states configured by using the media access control signaling. This is not specifically limited in this embodiment of this application. For example, if the quantity of bits in the TCI field in the DCI in the manner 3 is 3, and the quantity of bits in the TCI field in the DCI in the manner 1 is 2, information in the TCI field in the DCI in the manner 1 may be used to activate one of the first four or the last four TCI states in the eight candidate TCI states configured by using the media access control signaling.

Manner 4

The terminal receives media access control. The media access control is used to indicate one or more of one or more candidate TCI states configured by RRC and used for the BWP #1. The terminal receives the PDSCH in the BWP #2 based on the one or more TCI states.

Specifically, the network device may configure one or more candidate TCI states, for example, a TCI state #1 to a TCI state #16, for the PDCCH and/or the PDSCH in the BWP #1 by using the RRC signaling. The network device may activate one or more of the one or more candidate TCI states, for example, the TCI state #1, by using the media access control. In this case, the terminal may receive the PDSCH in the BWP #2 by using the activated TCI state #1.

It should be understood that the media access control signaling may be sent by the network device in the BWP #1, or may be sent by the network device in the BWP #2. If a plurality of TCI states are activated by using the media access control signaling, the terminal may use any one of the plurality of TCI states or a TCI state with a smallest index or a largest index. This is not limited in this embodiment of this application.

It should be further understood that the manner 2 is different from the manner 4. In the manner 2, the media access control is used to explicitly indicate that the activated TCI state is used to receive the PDSCH in the BWP #2. In the manner 4, a predefined manner may be used to define: The TCI state activated by using the media access control and used for the BWP #1 is used to receive the PDSCH in the BWP #2. It can be learned that in the manner 4, that the TCI state activated by using the media access control is used to receive the PDSCH in the BWP #2 can be explicitly indicated without signaling.

In addition, a quantity of bits of a bitmap (bitmap) used for configuring a TCI state and in the media access control signaling in the manner 2 may be different from a quantity of bits of a bitmap used for configuring a TCI state and in the media access control signaling in the manner 4. In this case, the bitmap in the media access control signaling in the manner 2 may activate the first several or the last several TCI states in candidate TCI states configured by using the RRC signaling. This is not specifically limited in this embodiment of this application. For example, if the quantity of bits of the bitmap in the media access control signaling in the manner 4 is 4, and the quantity of bits of the bitmap in the manner 2 is 3, the bitmap in the media access control signaling in the manner 2 may be used to activate the first eight or the last eight TCI states in the 16 candidate TCI states configured by using the RRC signaling.

Further, the DCI in the manner 2 and the manner 4 may further include the BWP switching indication information.

Specifically, the terminal receives the DCI. The DCI includes a TCI state and the BWP switching indication information. The terminal switches from the BWP #1 to the BWP #2 based on the BWP switching indication information, and receives the PDSCH in the BWP #2 based on the TCI state.

The foregoing describes in detail examples of the communication method provided in this application. It may be understood that to implement the foregoing functions, the terminal and the network device include corresponding hardware structures and/or software modules for performing the functions. A person skilled in the art should be easily aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 13:
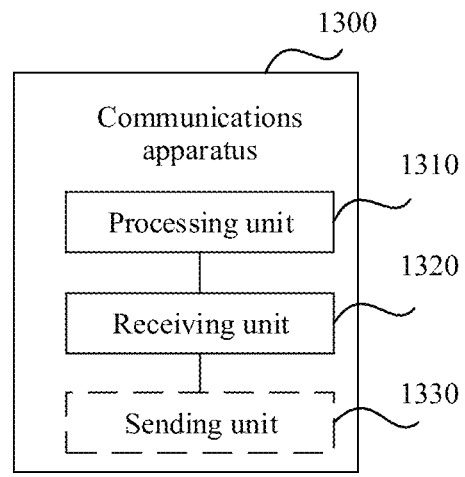
FIG. 13 is a schematic structural diagram of a communications apparatus according to an embodiment of this application.

FIG. 13 is a schematic structural diagram of a communications apparatus 1300 according to this application. The communications apparatus 1300 includes a processing unit 1310 and a receiving unit 1320. Optionally, the communications apparatus 1300 may further include a sending unit 1330.

The processing unit 1310 is configured to: determine a first BWP and a second BWP; and determine an association relationship between the first BWP and the second BWP; and the processing unit 1310 is configured to determine a first quasi co-location QCL relationship based on the association relationship, and the receiving unit 1320 is configured to receive a physical downlink shared channel PDSCH in the second BWP based on the first QCL relationship; and/or the processing unit 1310 is configured to determine a second QCL relationship based on the association relationship, and the receiving unit 1320 is configured to receive a physical downlink control channel PDCCH in the second BWP based on the second QCL relationship.

The communications apparatus 1300 may be a communications device (for example, a terminal), or may be a chip inside a communications device. When the communications apparatus is a communications device, the processing unit may be a processor, the sending unit and the receiving unit may be transceivers, the communications device may further include a storage unit, the storage unit may be a memory, the storage unit is configured to store an instruction, and the processing unit executes the instruction stored in the storage unit, so that the communications device performs the foregoing method. When the communications apparatus is a chip inside a network device, the processing unit may be a processor, the sending unit and the receiving unit may be input/output interfaces, pins, circuits, or the like, the processing unit executes an instruction stored in a storage unit, so that the communications device performs corresponding steps performed by the terminal, the storage unit may be a storage unit (for example, a register or a cache) inside the chip, or may be a storage unit (for example, a read-only memory or a random access memory) outside the chip and inside the communications device.

It may be clearly understood by a person skilled in the art that, when the communications apparatus 1300 is a terminal, for steps performed by the communications apparatus 1300 and corresponding beneficial effects, refer to related descriptions about the terminal in FIG. 2 or FIG. 13. For brevity, details are not described herein again.

Figure 14:
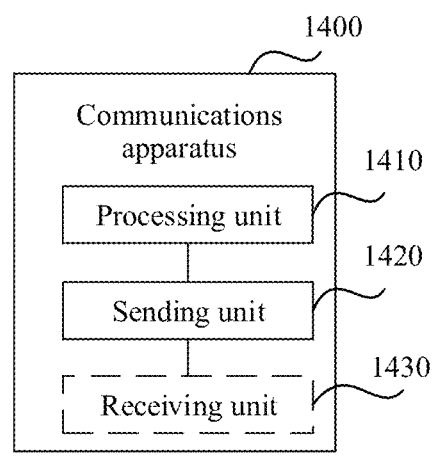
FIG. 14 is a schematic structural diagram of a communications apparatus according to an embodiment of this application.

FIG. 14 is a schematic structural diagram of a communications apparatus 1400 according to this application. The communications apparatus 1400 includes a processing unit 1410 and a sending unit 1420. Optionally, the communications apparatus 1400 may further include a receiving unit 1430.

The processing unit 1410 is configured to: determine a first BWP and a second BWP; and determine an association relationship between the first BWP and the second BWP; and the processing unit 1410 is configured to determine a first quasi co-location QCL relationship based on the association relationship, and the sending unit 1420 is configured to send a physical downlink shared channel PDSCH in the second BWP based on the first QCL relationship; and/or the processing unit 1410 is configured to determine a second QCL relationship based on the association relationship, and the sending unit 1420 is configured to send a physical downlink control channel PDCCH in the second BWP based on the second QCL relationship.

The communications apparatus 1400 may be a communications device (for example, a network device), or may be a chip inside a communications device. When the communications apparatus is a communications device, the processing unit may be a processor, the sending unit and the receiving unit may be transceivers, the communications device may further include a storage unit, the storage unit may be a memory, the storage unit is configured to store an instruction, and the processing unit executes the instruction stored in the storage unit, so that the communications device performs the foregoing method. When the communications apparatus is a chip inside a network device, the processing unit may be a processor, the sending unit and the receiving unit may be input/output interfaces, pins, circuits, or the like, the processing unit executes an instruction stored in a storage unit, so that the communications device performs corresponding steps performed by the network device, the storage unit may be a storage unit (for example, a register or a cache) inside the chip, or may be a storage unit (for example, a read-only memory or a random access memory) outside the chip and inside the communications device.

It may be clearly understood by a person skilled in the art that, when the communications apparatus 1400 is a network device, for steps performed by the communications apparatus 1400 and corresponding beneficial effects, refer to related descriptions about the network device in FIG. 2 or FIG. 14. For brevity, details are not described herein again.

It should be understood that division into the foregoing units is merely function division, and there may be another division method during actual implementation.

A person skilled in the art may clearly understand that, for detailed working processes of the foregoing apparatus and unit and technical effects achieved by performing steps, refer to the description in the corresponding method embodiments. For the purpose of brief description, details are not described herein again.

The communications apparatus may be a chip. The processing unit may be implemented by using hardware or software. When the processing unit is implemented by using hardware, the processing unit may be a logic circuit, an integrated circuit, or the like. When the processing unit is implemented by using software, the processor may be a general purpose processor, and is implemented by reading software code stored in a storage unit. The storage unit may be integrated into a processor, or may be located outside the processor and exist independently.

The following further describes, by using an example in which a communications apparatus is a terminal or a network device, a communications apparatus provided in this application.

Figure 15:
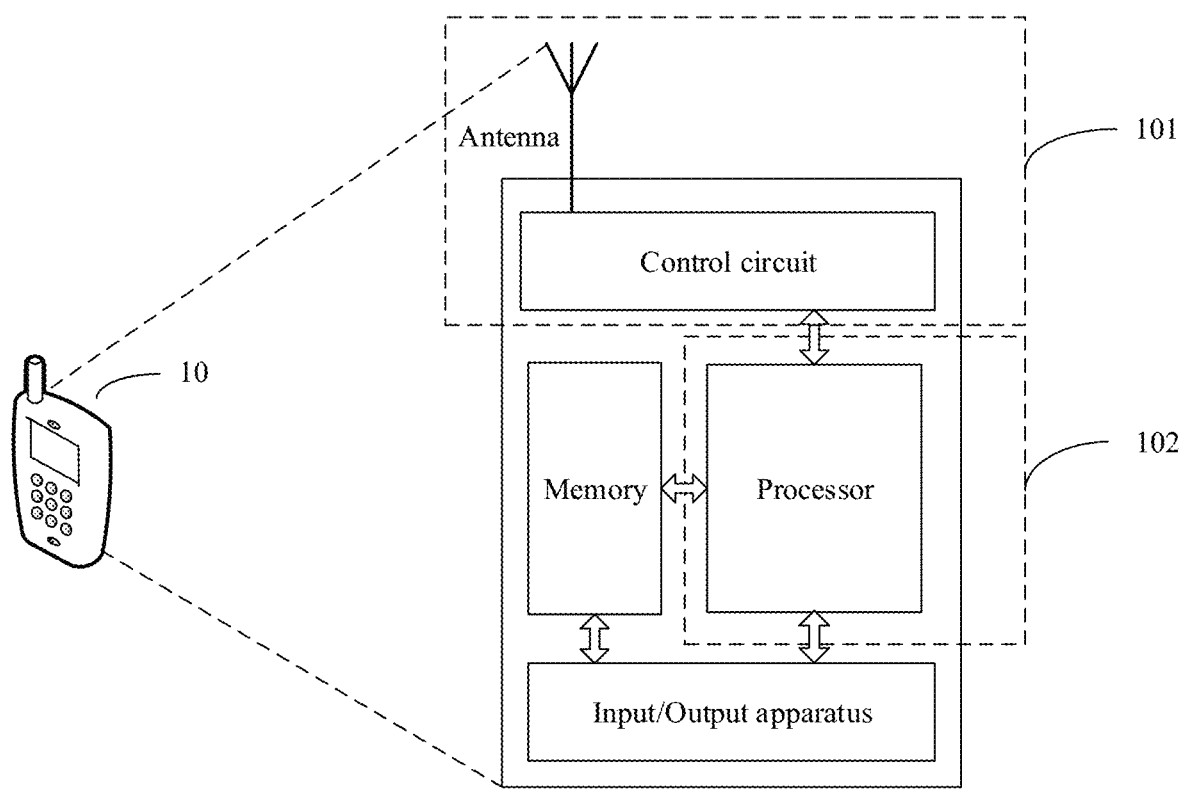
FIG. 15 is a schematic structural diagram of a terminal according to an embodiment of this application.

FIG. 15 is a schematic structural diagram of a terminal 10 according to this application. For ease of description, FIG. 15 shows only main components of the terminal. As shown in FIG. 15, the terminal 10 includes a processor, a memory, a control circuit, an antenna, and an input/output apparatus.

The processor is mainly configured to: process a communication protocol and communication data, control the entire terminal, execute a software program, and process data of the software program, for example, is configured to support the terminal in performing the action described in the foregoing embodiments of the communication method. The memory is mainly configured to store the software program and data, for example, store the QCL information or the TCI state that is described in the foregoing embodiments. The control circuit is mainly configured to perform conversion between a baseband signal and a radio frequency signal, and process the radio frequency signal. A combination of the control circuit and the antenna may also be referred to as a transceiver that is mainly configured to transmit and receive a radio frequency signal in an electromagnetic wave form. The input/output apparatus, such as a touchscreen, a display, or a keyboard, is mainly configured to receive data input by a user and data output to the user.

After the terminal is powered on, the processor may read a software program in a storage unit, explain and execute an instruction of the software program, and process data of the software program. When data needs to be sent in a wireless manner, after performing baseband processing on the to-be-sent data, the processor outputs a baseband signal to the radio frequency circuit. After performing radio frequency processing on the baseband signal, the radio frequency circuit sends a radio frequency signal through an antenna in a form of an electromagnetic wave. When data is sent to the terminal, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 15 shows only one memory and one processor. An actual terminal device may have a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communication protocol and the communication data. The central processing unit is mainly configured to: control the entire terminal, execute the software program, and process the data of the software program. Functions of the baseband processor and the central processing unit are integrated into the processor in FIG. 15. A person skilled in the art may understand that the baseband processor and the central processing unit each may be an independent processor, and are interconnected by using a technology such as a bus. A person skilled in the art may understand that the terminal may include a plurality of baseband processors to adapt to different network standards. The terminal may include a plurality of central processing units to enhance a processing capability of the terminal. Components of the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of the software program. The processor executes the software program to implement a baseband processing function.

For example, in this embodiment of this application, the antenna and the control circuit that have a transceiver function may be considered as a transceiver unit 101 of the terminal 10, and the processor having a processing function may be considered as a processing unit 102 of the terminal 10. As shown in FIG. 15, the terminal 10 includes the transceiver unit 101 and the processing unit 102. The transceiver unit may also be referred to as a transceiver, a transceiver, a transceiver apparatus, or the like. Optionally, a component that is in the transceiver unit 101 and that is configured to implement a receiving function may be considered as a receiving unit, and a component that is in the transceiver unit 101 and that is configured to implement a sending function may be considered as a sending unit. That is, the transceiver unit 101 includes the receiving unit and the sending unit. For example, the receiving unit may also be referred to as a receiver, a receiver, a receiver circuit, or the like, and the sending unit may be referred to as a transmitter, a transmitter, a transmitting circuit, or the like.

The terminal shown in FIG. 15 may perform actions performed by the terminal in the foregoing method. To avoid repetition, detailed descriptions thereof are omitted herein.

Figure 16:
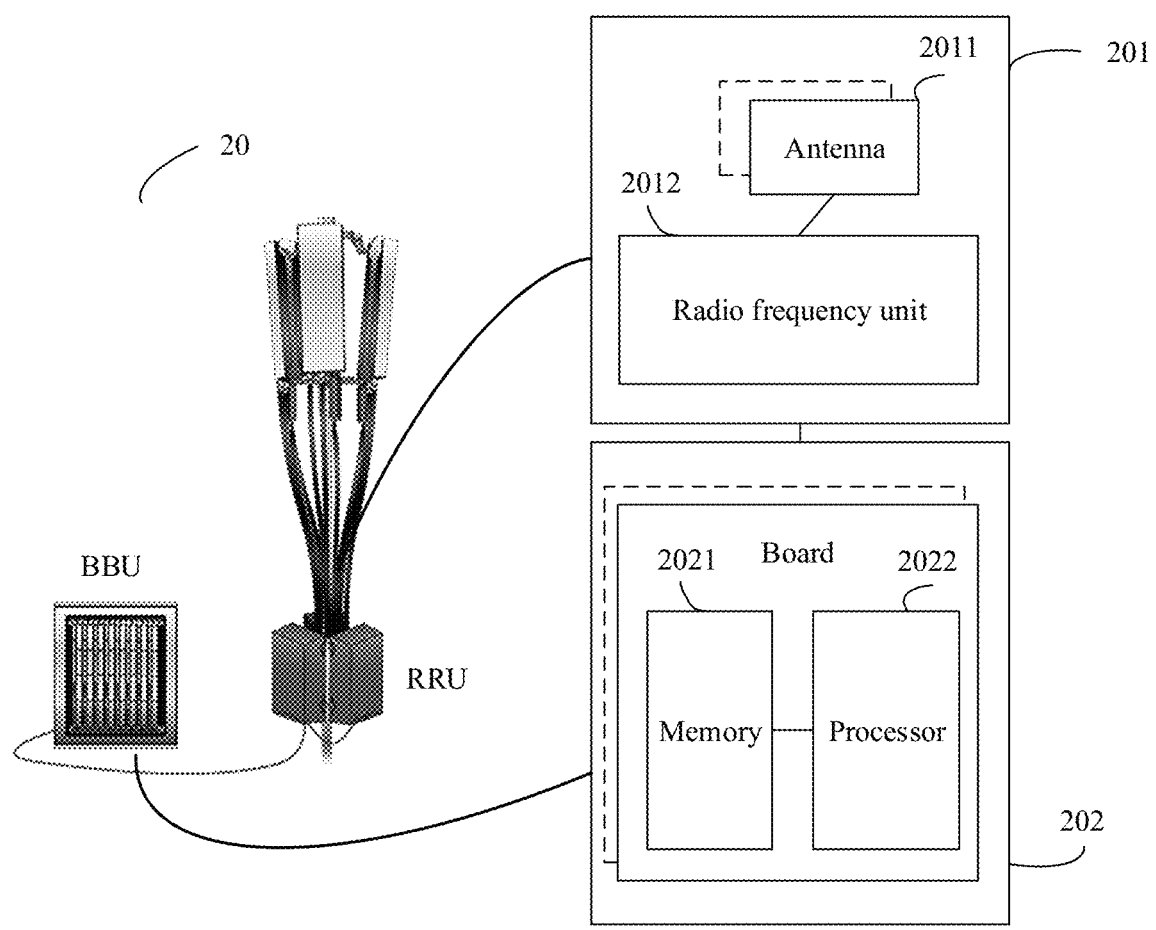
FIG. 16 is a schematic structural diagram of a network device according to an embodiment of this application.

FIG. 16 is a schematic structural diagram of a network device according to this application. The network device may be, for example, a base station. As shown in FIG. 16, the base station may be applicable to the communications system shown in FIG. 1, and perform a function of the network device in the method embodiments. The base station 20 may include one or more radio frequency units such as a remote radio unit (remote radio unit, RRU) 201 and one or more baseband units (baseband unit, BBU) (which may also be referred to as a digital unit (digital unit, DU)) 202. The RRU 201 may be referred to as a transceiver unit, a transceiver, a transceiver circuit, a transceiver, or the like, and may include at least one antenna 2011 and at least one radio frequency unit 2012. The RRU 201 is mainly configured to: send and receive a radio frequency signal, and perform conversion between a radio frequency signal and a baseband signal, for example, is configured to send the PDCCH and/or the PDSCH in the foregoing method embodiments. The BBU 202 is mainly configured to perform baseband processing, control the base station, and so on. The RRU 201 and the BBU 202 may be physically disposed together, or may be physically separated, that is, in a distributed base station.

The BBU 202 is a control center of the base station, may also be referred to as a processing unit, and is mainly configured to complete baseband processing functions such as channel coding, multiplexing, modulation, and spectrum spreading. For example, the BBU (the processing unit) 202 may be configured to control the base station to perform an operation procedure related to the network device in the method embodiments.

In an embodiment, the BBU 202 may include one or more boards. A plurality of boards may jointly support a radio access network (such as an LTE network) of a single access standard, or may separately support radio access networks (such as an LTE network, a 5G network, or another network) of different access standards. The BBU 202 further includes a memory 2021 and a processor 2022. The memory 2021 is configured to store a necessary instruction and necessary data. For example, the memory 2021 stores the QCL information or the TCI state in the foregoing method embodiments. The processor 2022 is configured to control the base station to perform a necessary action, for example, is configured to control the base station to perform an operation procedure related to the network device in the foregoing method embodiments. The memory 2021 and the processor 2022 may serve the one or more boards. In other words, a memory and a processor may be independently disposed on each board. Alternatively, the plurality of boards may share a same memory and a same processor. In addition, a necessary circuit may further be disposed on each board.

This application further provides the following embodiments. It should be noted that numbers of the following embodiments do not necessarily need to comply with a numbering sequence of the foregoing embodiments.

Embodiment 1: A communication method includes:
determining a first bandwidth part BWP and a second BWP;
determining an association relationship between the first BWP and the second BWP; and
determining a first quasi co-location QCL relationship based on the association relationship, and receiving a physical downlink shared channel PDSCH in the second BWP based on the first QCL relationship; and/or
determining a second QCL relationship based on the association relationship, and receiving a physical downlink control channel PDCCH in the second BWP based on the second QCL relationship.

Embodiment 2: According to the method according to Embodiment 1, the determining a first quasi co-location QCL relationship based on the association relationship includes:
if there is the association relationship between the first BWP and the second BWP, the first QCL relationship is indicated by using QCL information included in downlink control information DCI, where the DCI further includes BWP switching indication information, and the BWP switching indication information is used to indicate a terminal to switch from the first BWP to the second BWP.

Embodiment 3: According to the method according to Embodiment 1 or 2, the determining a first quasi co-location QCL relationship based on the association relationship and/or the determining a second QCL relationship based on the association relationship include/includes:
if there is the association relationship between the first BWP and the second BWP, the first QCL relationship and/or the second QCL relationship are/is indicated by using default QCL information, and the default QCL information is at least one of the following:
QCL information of a control-resource set with a smallest index or identifier in control-resource sets included in the first BWP or the second BWP;
QCL information of a control-resource set included in both the first BWP and the second BWP;
QCL information of a control-resource set included in the first BWP in a frequency domain resource on which the first BWP and the second BWP overlap;
third QCL information in QCL information configured for a control-resource set and/or a PDSCH in the first BWP, where a reference signal indicated by using the third QCL information is located in the second BWP; and
fourth QCL information in QCL information configured for a control-resource set and/or a PDSCH in the second BWP, where a reference signal indicated by using the fourth QCL information is located in the first BWP.

Embodiment 4: According to the method according to any one of Embodiments 1 to 3, the determining a first quasi co-location QCL relationship based on the association relationship includes:
if there is the association relationship between the first BWP and the second BWP, the first QCL relationship is indicated by using default QCL information, and the default QCL information is:
QCL information of a control-resource set on which downlink control information DCI for scheduling the PDSCH is located.

Embodiment 5: According to the method according to any one of Embodiments 1 to 4, the determining a first quasi co-location QCL relationship based on the association relationship and/or the determining a second QCL relationship based on the association relationship include/includes:

if there is no association relationship between the first BWP and the second BWP, the first QCL relationship and/or the second QCL relationship are/is indicated by using default QCL information, and the default QCL information is at least one of the following:

one of pieces of QCL information configured for a control-resource set and/or a PDSCH in the second BWP;

QCL information of a synchronization signal/physical broadcast channel block SSB used for initial access;

QCL information used to receive a broadcast PDCCH; and

QCL information of an SSB with a smallest index in SSBs included in the second BWP.

Embodiment 6: According to the method according to Embodiment 5, if the second BWP is an initial BWP or includes an initial BWP, or if the second BWP does not include an SSB, the first QCL relationship and/or the second QCL relationship are/is indicated by using the QCL information of the SSB used for the initial access or the QCL information used to receive the broadcast PDCCH; and/or if the second BWP does not include an initial BWP, and the second BWP includes the SSBs, the first QCL relationship and/or the second QCL relationship are/is indicated by using the QCL information of the SSB with the smallest index in the SSBs included in the second BWP.

Embodiment 7: According to the method according to any one of Embodiments 1 to 6, the PDSCH is scheduled by using the downlink control information DCI, and the DCI further includes the BWP switching indication information.

Embodiment 8: According to the method according to Embodiment 7, if a scheduling offset is greater than or equal to a first threshold, the first QCL relationship is indicated by using QCL information included in the BWP switching indication information; and/or if the scheduling offset is less than the first threshold, the first QCL relationship is indicated by using the default QCL information, where the first threshold is a sum of time required for beam switching and BWP switching of the terminal.

Embodiment 9: According to the method according to Embodiment 1, the determining a first quasi co-location QCL relationship based on the association relationship and/or the determining a second QCL relationship based on the association relationship include/includes:

if there is the association relationship between the first BWP and the second BWP, the second QCL relationship is indicated by using at least one of the following QCL information:

QCL information of a control-resource set that is in the first BWP and that is closest to the second BWP in frequency domain.

Embodiment 10: According to the method according to any one of Embodiments 1, 3 to 6, and 9, the receiving a PDSCH in the second BWP based on the first QCL relationship and/or the receiving a PDCCH in the second BWP based on the second QCL relationship include/includes:

before receiving QCL information of a control-resource set and/or the PDSCH in the second BWP, receiving the PDSCH in the second BWP based on the first QCL relationship, and/or receiving the PDCCH in the second BWP based on the second QCL relationship.

Embodiment 11: According to the method according to any one of Embodiments 1 to 10, the association relationship between the first BWP and the second BWP includes at least one of the following cases:

the first BWP and the second BWP partially or completely overlap in frequency domain;

a reference signal configured for the first BWP and a reference signal configured for the second BWP satisfy a quasi co-location QCL relationship;

the first BWP and the second BWP include the same control-resource set; and the first BWP and the second BWP are intra-band BWPs.

Embodiment 12: According to the method according to any one of Embodiments 1 to 11, the determining a first bandwidth part BWP and a second BWP includes:

receiving BWP switching indication information; and switching from the first BWP to the second BWP based on the BWP switching indication information.

Embodiment 13: A communication method includes:

determining a first bandwidth part BWP and a second BWP;

determining an association relationship between the first BWP and the second BWP; and determining a first quasi co-location QCL relationship based on the association relationship, and sending a physical downlink shared channel PDSCH in the second BWP based on the first QCL relationship; and/or determining a second QCL relationship based on the association relationship, and sending a physical downlink control channel PDCCH in the second BWP based on the second QCL relationship.

Embodiment 14: According to the method according to Embodiment 13, the determining a first quasi co-location QCL relationship based on the association relationship includes:

if there is the association relationship between the first BWP and the second BWP, the first QCL relationship is indicated by using QCL information included in downlink control information DCI, the DCI further includes BWP switching indication information, and the BWP switching indication information is used to indicate a terminal to switch from the first BWP to the second BWP.

Embodiment 15: According to the method according to Embodiment 13 or 14, the determining a first quasi co-location QCL relationship based on the association relationship and/or the determining a second QCL relationship based on the association relationship include/includes:

if there is the association relationship between the first BWP and the second BWP, the first QCL relationship and/or the second QCL relationship are/is indicated by using default QCL information, and the default QCL information is at least one of the following:

QCL information of a control-resource set with a smallest index or identifier in control-resource sets included in the first BWP or the second BWP;

QCL information of a control-resource set included in both the first BWP and the second BWP;

QCL information of a control-resource set included in the first BWP in a frequency domain resource on which the first BWP and the second BWP overlap;

third QCL information in QCL information configured for a control-resource set and/or a PDSCH in the first BWP, where a reference signal indicated by using the third QCL information is located in the second BWP; and fourth QCL information in QCL information configured for a control-resource set and/or a PDSCH in the second BWP, where a reference signal indicated by using the fourth QCL information is located in the first BWP.

Embodiment 16: According to the method according to any one of Embodiments 13 to 15, the determining a first quasi co-location QCL relationship based on the association relationship includes:

if there is the association relationship between the first BWP and the second BWP, the first QCL relationship is indicated by using default QCL information, and the default QCL information is:

QCL information of a control-resource set on which DCI for scheduling the PDSCH is located.

Embodiment 17: According to the method according to any one of Embodiments 13 to 16, the determining a first quasi co-location QCL relationship based on the association relationship and/or the determining a second QCL relationship based on the association relationship include/includes:

if there is no association relationship between the first BWP and the second BWP, the first QCL relationship and/or the second QCL relationship are/is indicated by using default QCL information, and the default QCL information is at least one of the following:

one of pieces of QCL information configured for a control-resource set and/or a PDSCH in the second BWP;

QCL information of a synchronization signal/physical broadcast channel block SSB used for initial access;

QCL information used to receive a broadcast PDCCH; and

QCL information of an SSB with a smallest index in SSBs included in the second BWP.

Embodiment 18: According to the method according to Embodiment 17, if the second BWP is an initial BWP or includes an initial BWP, or if the second BWP does not include an SSB, the first QCL relationship and/or the second QCL relationship are/is indicated by using the QCL information of the SSB used for the initial access or the QCL information used to receive the broadcast PDCCH; and/or if the second BWP does not include an initial BWP, and the second BWP includes the SSBs, the first QCL relationship and/or the second QCL relationship are/is indicated by using the QCL information of the SSB with the smallest index in the SSBs included in the second BWP.

Embodiment 19: According to the method according to any one of Embodiments 13 to 18, the PDSCH is scheduled by using the downlink control information DCI, and the DCI further includes the BWP switching indication information.

Embodiment 20: According to the method according to Embodiment 19, if a scheduling offset is greater than or equal to a first threshold, the first QCL relationship is indicated by using QCL information included in the BWP switching indication information; and/or if the scheduling offset is less than the first threshold, the first QCL relationship is indicated by using the default QCL information, where the first threshold is a sum of time required for beam switching and BWP switching of the terminal.

Embodiment 21: According to the method according to Embodiment 13, the determining a first quasi co-location QCL relationship based on the association relationship and/or the determining a second QCL relationship based on the association relationship include/includes:

if there is the association relationship between the first BWP and the second BWP, the second QCL relationship is indicated by using at least one of the following QCL information:

QCL information of a control-resource set that is in the first BWP and that is closest to the second BWP in frequency domain.

Embodiment 22: According to the method according to any one of Embodiments 13, 15 to 18, and 21, the sending a PDSCH in the second BWP based on the first QCL relationship and/or the sending a PDCCH in the second BWP based on the second QCL relationship include/includes:

before sending QCL information of a control-resource set and/or the PDSCH in the second BWP, sending the PDSCH in the second BWP based on the first QCL relationship, and/or sending the PDCCH in the second BWP based on the second QCL relationship.

Embodiment 23: According to the method according to any one of Embodiments 13 to 21, the association relationship between the first BWP and the second BWP includes at least one of the following cases:

the first BWP and the second BWP partially or completely overlap in frequency domain;

a reference signal configured for the first BWP and a reference signal configured for the second BWP satisfy a quasi co-location QCL relationship;

the first BWP and the second BWP include the same control-resource set; and the first BWP and the second BWP are intra-band BWPs.

Embodiment 24: According to the method according to any one of Embodiments 13 to 23, after the determining a first bandwidth part BWP and a second BWP, the method further includes:

sending BWP switching indication information, where the BWP switching indication information is used to indicate the terminal to switch from the first BWP to the second BWP.

Embodiment 25: A communications apparatus includes:

a processing unit, configured to determine a first bandwidth part BWP and a second BWP, where the processing unit is further configured to determine an association relationship between the first BWP and the second BWP; and the processing unit is configured to determine a first quasi co-location QCL relationship based on the association relationship, and a receiving unit is configured to receive a physical downlink shared channel PDSCH in the second BWP based on the first QCL relationship; and/or the processing unit is configured to determine a second QCL relationship based on the association relationship, and the receiving unit is configured to receive a physical downlink control channel PDCCH in the second BWP based on the second QCL relationship.

Embodiment 26: According to the communications apparatus according to Embodiment 25, the processing unit is specifically configured to:

if there is the association relationship between the first BWP and the second BWP, determine that the first QCL relationship is indicated by using QCL information included in downlink control information DCI, where the DCI further includes BWP switching indication information, and the BWP switching indication information is used to indicate a terminal to switch from the first BWP to the second BWP.

Embodiment 27: According to the communications apparatus according to Embodiment 25 or 26, the processing unit is specifically configured to:

if there is the association relationship between the first BWP and the second BWP, determine that the first QCL relationship and/or the second QCL relationship are/is indicated by using default QCL information, where the default QCL information is at least one of the following:

QCL information of a control-resource set with a smallest index or identifier in control-resource sets included in the first BWP or the second BWP;

QCL information of a control-resource set included in both the first BWP and the second BWP;

QCL information of a control-resource set included in the first BWP in a frequency domain resource on which the first BWP and the second BWP overlap;

third QCL information in QCL information configured for a control-resource set and/or a PDSCH in the first BWP, where a reference signal indicated by using the third QCL information is located in the second BWP; and fourth QCL information in QCL information configured for a control-resource set and/or a PDSCH in the second BWP, where a reference signal indicated by using the fourth QCL information is located in the first BWP.

Embodiment 28: According to the communications apparatus according to any one of Embodiments 25 to 27, the processing unit is specifically configured to:

if there is the association relationship between the first BWP and the second BWP, determine that the first QCL relationship is indicated by using default QCL information, where the default QCL information is:

QCL information of a control-resource set on which DCI for scheduling the PDSCH is located.

Embodiment 29: According to the communications apparatus according to any one of Embodiments 25 to 28, the processing unit is specifically configured to:

if there is no association relationship between the first BWP and the second BWP, determine that the first QCL relationship and/or the second QCL relationship are/is indicated by using default QCL information, where the default QCL information is at least one of the following:

one of pieces of QCL information configured for a control-resource set and/or a PDSCH in the second BWP;

QCL information of a synchronization signal/physical broadcast channel block SSB used for initial access;

QCL information used to receive a broadcast PDCCH; and

QCL information of an SSB with a smallest index in SSBs included in the second BWP.

Embodiment 30: According to the communications apparatus according to Embodiment 29, if the second BWP is an initial BWP or includes an initial BWP, or if the second BWP does not include an SSB, the first QCL relationship and/or the second QCL relationship are/is indicated by using the QCL information of the SSB used for the initial access or the QCL information used to receive the broadcast PDCCH; and/or if the second BWP does not include an initial BWP, and the second BWP includes the SSBs, the first QCL relationship and/or the second QCL relationship are/is indicated by using the QCL information of the SSB with the smallest index in the SSBs included in the second BWP.

Embodiment 31: According to the communications apparatus according to any one of Embodiments 25 to 30, the PDSCH is scheduled by using the downlink control information DCI, and the DCI further includes the BWP switching indication information.

Embodiment 32: According to the communications apparatus according to Embodiment 31, if a scheduling offset is greater than or equal to a first threshold, the first QCL relationship is indicated by using QCL information included in the BWP switching indication information; and/or if the scheduling offset is less than the first threshold, the first QCL relationship is indicated by using the default QCL information, where the first threshold is a sum of time required for beam switching and BWP switching of the terminal.

Embodiment 33: According to the communications apparatus according to Embodiment 25, the processing unit is specifically configured to:

if there is the association relationship between the first BWP and the second BWP, determine that the second QCL relationship is indicated by using at least one of the following QCL information:

QCL information of a control-resource set that is in the first BWP and that is closest to the second BWP in frequency domain.

Embodiment 34: According to the communications apparatus according to any one of Embodiments 25, 27 to 30, and 33, the receiving unit is specifically configured to:

before receiving QCL information of a control-resource set and/or the PDSCH in the second BWP, receive the PDSCH in the second BWP based on the first QCL relationship, and/or receive the PDCCH in the second BWP based on the second QCL relationship.

Embodiment 35: According to the communications apparatus according to any one of Embodiments 25 to 34, the association relationship between the first BWP and the second BWP includes at least one of the following cases:

the first BWP and the second BWP partially or completely overlap in frequency domain;

a reference signal configured for the first BWP and a reference signal configured for the second BWP satisfy a quasi co-location QCL relationship;

the first BWP and the second BWP include the same control-resource set; and the first BWP and the second BWP are intra-band BWPs.

Embodiment 36: According to the communications apparatus according to any one of Embodiments 25 to 35, the receiving unit is further configured to:

receive BWP switching indication information; and the processing unit is specifically configured to switch from the first BWP to the second BWP based on the BWP switching indication information.

Embodiment 37: A communications apparatus includes:

a processing unit, configured to determine a first bandwidth part BWP and a second BWP, where the processing unit is further configured to determine an association relationship between the first BWP and the second BWP; and the processing unit is further configured to determine a first quasi co-location QCL relationship based on the association relationship, and a sending unit is configured to send a physical downlink shared channel PDSCH in the second BWP based on the first QCL relationship; and/or the processing unit is further configured to determine a second QCL relationship based on the association relationship, and the sending unit is configured to send a physical downlink control channel PDCCH in the second BWP based on the second QCL relationship.

Embodiment 38: According to the communications apparatus according to Embodiment 37, the processing unit is specifically configured to:

if there is the association relationship between the first BWP and the second BWP, determine that the first QCL relationship is indicated by using QCL information included in downlink control information DCI, where the DCI further includes BWP switching indication information, and the BWP switching indication information is used to indicate a terminal to switch from the first BWP to the second BWP.

Embodiment 39: According to the communications apparatus according to Embodiment 37 or 38, the processing unit is specifically configured to:

if there is the association relationship between the first BWP and the second BWP, determine that the first QCL relationship and/or the second QCL relationship are/is indicated by using default QCL information, where the default QCL information is at least one of the following:

QCL information of a control-resource set with a smallest index or identifier in control-resource sets included in the first BWP or the second BWP;

QCL information of a control-resource set included in both the first BWP and the second BWP;

QCL information of a control-resource set included in the first BWP in a frequency domain resource on which the first BWP and the second BWP overlap;

third QCL information in QCL information configured for a control-resource set and/or a PDSCH in the first BWP, where a reference signal indicated by using the third QCL information is located in the second BWP; and fourth QCL information in QCL information configured for a control-resource set and/or a PDSCH in the second BWP, where a reference signal indicated by using the fourth QCL information is located in the first BWP.

Embodiment 40: According to the communications apparatus according to any one of Embodiments 37 to 39, the processing unit is specifically configured to:

if there is the association relationship between the first BWP and the second BWP, determine that the first QCL relationship is indicated by using default QCL information, where the default QCL information is:

QCL information of a control-resource set on which DCI for scheduling the PDSCH is located.

Embodiment 41: According to the communications apparatus according to any one of Embodiments 37 to 40, the processing unit is specifically configured to:

if there is no association relationship between the first BWP and the second BWP, determine that the first QCL relationship and/or the second QCL relationship are/is indicated by using default QCL information, where the default QCL information is at least one of the following:

one of pieces of QCL information configured for a control-resource set and/or a PDSCH in the second BWP;

QCL information of a synchronization signal/physical broadcast channel block SSB used for initial access;

QCL information used to receive a broadcast PDCCH; and

QCL information of an SSB with a smallest index in SSBs included in the second BWP.

Embodiment 42: According to the communications apparatus according to Embodiment 41, if the second BWP is an initial BWP or includes an initial BWP, or if the second BWP does not include an SSB, the first QCL relationship and/or the second QCL relationship are/is indicated by using the QCL information of the SSB used for the initial access or the QCL information used to receive the broadcast PDCCH; and/or if the second BWP does not include an initial BWP, and the second BWP includes the SSBs, the first QCL relationship and/or the second QCL relationship are/is indicated by using the QCL information of the SSB with the smallest index in the SSBs included in the second BWP.

Embodiment 43: According to the communications apparatus according to any one of Embodiments 37 to 42, the PDSCH is scheduled by using the downlink control information DCI, and the DCI further includes the BWP switching indication information.

Embodiment 44: According to the communications apparatus according to Embodiment 43, if a scheduling offset is greater than or equal to a first threshold, the first QCL relationship is indicated by using QCL information included in the BWP switching indication information; and/or if the scheduling offset is less than the first threshold, the first QCL relationship is indicated by using the default QCL information, where the first threshold is a sum of time required for beam switching and BWP switching of the terminal.

Embodiment 45: According to the communications apparatus according to Embodiment 37, the processing unit is specifically configured to:

if there is the association relationship between the first BWP and the second BWP, the second QCL relationship is indicated by using at least one of the following QCL information:

QCL information of a control-resource set that is in the first BWP and that is closest to the second BWP in frequency domain.

Embodiment 46: According to the communications apparatus according to any one of Embodiments 37, 39 to 42, and 45, the sending unit is specifically configured to:

before receiving QCL information of a control-resource set and/or the PDSCH in the second BWP, send the PDSCH in the second BWP based on the first QCL relationship, and/or send the PDCCH in the second BWP based on the second QCL relationship.

Embodiment 47: According to the communications apparatus according to any one of Embodiments 37 to 46, the association relationship between the first BWP and the second BWP includes at least one of the following cases:

the first BWP and the second BWP partially or completely overlap in frequency domain;

a reference signal configured for the first BWP and a reference signal configured for the second BWP satisfy a quasi co-location QCL relationship;

the first BWP and the second BWP include the same control-resource set; and the first BWP and the second BWP are intra-band BWPs.

Embodiment 48: According to the communications apparatus according to any one of Embodiments 37 to 47, the sending unit is further configured to:

send BWP switching indication information, where the BWP switching indication information is used to indicate the terminal to switch from the first BWP to the second BWP.

This application further provides a communications system, including the foregoing one or more network devices and one or more terminals.

It should be understood that the processor in the embodiments of this application may be an integrated circuit chip, and has a signal processing capability. In an implementation process, steps in the foregoing method embodiments can be implemented by using a hardware integrated logic circuit in the processor, or by using instructions in a form of software. The foregoing processor may be a general purpose processor, a digital signal processor (digital signal processor, DSP), an application specific integrated circuit (application specific integrated circuit, ASIC), a field programmable gate array (field programmable gate array, FPGA) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any memory of another proper type.

This application further provides a computer-readable medium. The computer-readable medium stores a computer program. When the computer program is executed by a computer, the function in any one of the foregoing method embodiments is implemented.

This application further provides a computer program product. When the computer program product is executed by a computer, the function in any one of the foregoing method embodiments is implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (high-density digital video disc, DVD), a semiconductor medium (for example, a solid-state drive (solid state disk, SSD)), or the like.

It should be understood that "an embodiment" mentioned in the whole specification means that particular features, structures, or characteristics related to the embodiment are included in at least one embodiment of this application. Therefore, the embodiments in the entire specification do not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It should be further understood that, in this application, "when" and "if" mean that the UE or the base station performs corresponding processing in an objective situation, and are not intended to limit time, and the UE or the base station is not necessarily required to have a determining action during implementation, and do not mean any other limitation.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists.

The term "at least one of" or "at least one type of" in this specification indicates all of or any combination of the listed items, for example, "at least one of A, B, and C" may indicate the following six cases: Only A exists, only B exists, only C exists, both A and B exist, both B and C exist, and A, B and C all exist.

It should be understood that in the embodiments of this application, "B corresponding to A" indicates that B is associated with A, and B may be determined based on A. However, it should be further understood that determining A based on B does not mean that B is determined based on only A. That is, B may also be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

With descriptions of the foregoing implementations, a person skilled in the art may clearly understand that this application may be implemented by hardware, firmware or a combination thereof. When this application is implemented by using software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium that can be accessed by a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (disk) and disc (disc) used in this application includes a compact disc CD, a laser disc, an optical disc, a digital versatile disc (DVD), a floppy disk and a Blu-ray disc, where the disk generally copies data by a magnetic means, and the disc copies data by a laser means. The foregoing combination should also be included in the protection scope of the computer-readable medium.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A communication method, comprising:
   determining a first bandwidth part (BWP) and a second BWP;
   determining an association relationship between the first BWP and the second BWP, wherein the association relationship satisfies that the first BWP and the second BWP each include a same control resource set (CORESET); and
   at least one of:
      determining a first quasi co-location (QCL) relationship between a reference signal of the first BWP and a reference signal of the second BWP based on the association relationship, and receiving a physical downlink shared channel (PDSCH) in the second BWP based on the first QCL relationship; or
      determining a second QCL relationship between a reference signal of the first BWP and a reference signal of the second BWP based on the association relationship, and receiving a physical downlink control channel (PDCCH) in the second BWP based on the second QCL relationship.

2. The method according to claim 1, wherein the first QCL relationship is indicated by using QCL information comprised in downlink control information (DCI), wherein the DCI further comprises BWP switching indication information, and wherein the BWP switching indication information is used to indicate a terminal to switch from the first BWP to the second BWP.

3. The method according to claim 1, wherein at least one of the first QCL relationship or the second QCL relationship is indicated by using default QCL information, and wherein the default QCL information is at least one of:
   QCL information of a control-resource set with a smallest index or identifier in control-resource sets comprised in the first BWP or the second BWP;
   QCL information of a control-resource set comprised in both the first BWP and the second BWP;
   QCL information of a control-resource set comprised in the first BWP in a frequency domain resource on which the first BWP and the second BWP overlap;
   first QCL information in QCL information configured for at least one of a control-resource set or a PDSCH in the first BWP, wherein a reference signal indicated by using the first QCL information is located in the second BWP; or
   second QCL information in QCL information configured for at least one of a control-resource set or a PDSCH in the second BWP, wherein a reference signal indicated by using the second QCL information is located in the first BWP.

4. The method according to claim 1, wherein the first QCL relationship is indicated by using default QCL information, and wherein the default QCL information is QCL information of a control-resource set on which downlink control information (DCI) for scheduling the PDSCH is located.

5. The method according to claim 1, wherein at least one of the first QCL relationship or the second QCL relationship is indicated by using default QCL information, and wherein the default QCL information is at least one of:
   one of pieces of QCL information configured for at least one of a control-resource set or a PDSCH in the second BWP;
   QCL information of a synchronization signal/physical broadcast channel block (SSB) used for initial access;
   QCL information used to receive a broadcast PDCCH; or
   QCL information of an SSB with a smallest index in SSBs comprised in the second BWP.

6. A communication method, comprising:
   determining a first bandwidth part (BWP) and a second BWP;
   determining an association relationship between the first BWP and the second BWP, wherein the association relationship satisfies that the first BWP and the second BWP each include a same control resource set (CORESET); and
   at least one of:
      determining a first quasi co-location (QCL) relationship between a reference signal of the first BWP and a reference signal of the second BWP based on the association relationship, and sending a physical downlink shared channel (PDSCH) in the second BWP based on the first QCL relationship; or
      determining a second QCL relationship between a reference signal of the first BWP and a reference signal of the second BWP based on the association relationship, and sending a physical downlink control channel (PDCCH) in the second BWP based on the second QCL relationship.

7. The method according to claim 6, wherein the first QCL relationship is indicated by using QCL information comprised in downlink control information (DCI), wherein the DCI further comprises BWP switching indication information, and wherein the BWP switching indication information is used to indicate a terminal to switch from the first BWP to the second BWP.

8. The method according to claim 6, wherein at least one of the first QCL relationship or the second QCL relationship is indicated by using default QCL information, and wherein the default QCL information is at least one of:
- QCL information of a control-resource set with a smallest index or identifier in control-resource sets comprised in the first BWP or the second BWP;
- QCL information of a control-resource set comprised in both the first BWP and the second BWP;
- QCL information of a control-resource set comprised in the first BWP in a frequency domain resource on which the first BWP and the second BWP overlap;
- first QCL information in QCL information configured for at least one of a control-resource set or a PDSCH in the first BWP, wherein a reference signal indicated by using the first QCL information is located in the second BWP; or
- second QCL information in QCL information configured for at least one of a control-resource set or a PDSCH in the second BWP, wherein a reference signal indicated by using the second QCL information is located in the first BWP.

9. The method according to any one of claim 6, wherein the first QCL relationship is indicated by using default QCL information, and wherein the default QCL information is QCL information of a control-resource set on which DCI for scheduling the PDSCH is located.

10. The method according to claim 6, wherein at least one of the first QCL relationship or the second QCL relationship is indicated by using default QCL information, and wherein the default QCL information is at least one of:
- one of pieces of QCL information configured for at least one of a control-resource set or a PDSCH in the second BWP;
- QCL information of a synchronization signal/physical broadcast channel block (SSB) used for initial access;
- QCL information used to receive a broadcast PDCCH; or
- QCL information of an SSB with a smallest index in SSBs comprised in the second BWP.

11. A communications apparatus, comprising:
a receiver;
at least one processor; and
one or more memories coupled to the at least one processor and storing programming instructions for execution by the at least one processor to:
- determine a first bandwidth part (BWP) and a second BWP;
- determine an association relationship between the first BWP and the second BWP, wherein the association relationship satisfies that the first BWP and the second BWP each include a same control resource set (CORESET); and
- at least one of:
  - determine a first quasi co-location (QCL) relationship between a reference signal of the first BWP and a reference signal of the second BWP based on the association relationship, wherein the receiver is configured to receive a physical downlink shared channel (PDSCH) in the second BWP based on the first QCL relationship; or
  - determine a second QCL relationship between a reference signal of the first BWP and a reference signal of the second BWP based on the association relationship, wherein the receiver is configured to receive a physical downlink control channel (PDCCH) in the second BWP based on the second QCL relationship.

12. The communications apparatus according to claim 11, wherein the programming instructions are for execution by the at least one processor to:
determine that the first QCL relationship is indicated by using QCL information comprised in downlink control information (DCI), wherein the DCI further comprises BWP switching indication information, and wherein the BWP switching indication information is used to indicate a terminal to switch from the first BWP to the second BWP.

13. The communications apparatus according to claim 11, wherein the programming instructions are for execution by the at least one processor to:
determine that at least one of the first QCL relationship or the second QCL relationship is indicated by using default QCL information, wherein the default QCL information is at least one of:
- QCL information of a control-resource set with a smallest index or identifier in control-resource sets comprised in the first BWP or the second BWP;
- QCL information of a control-resource set comprised in both the first BWP and the second BWP;
- QCL information of a control-resource set comprised in the first BWP in a frequency domain resource on which the first BWP and the second BWP overlap;
- first QCL information in QCL information configured for at least one of a control-resource set or a PDSCH in the first BWP, wherein a reference signal indicated by using the first QCL information is located in the second BWP; or
- second QCL information in QCL information configured for at least one of a control-resource set or a PDSCH in the second BWP, wherein a reference signal indicated by using the second QCL information is located in the first BWP.

14. The communications apparatus according to claim 11, wherein the programming instructions are for execution by the at least one processor to:
determine that the first QCL relationship is indicated by using default QCL information, wherein the default QCL information is QCL information of a control-resource set on which DCI for scheduling the PDSCH is located.

15. The communications apparatus according to claim 11, wherein the programming instructions are for execution by the at least one processor to:
determine that at least one of the first QCL relationship or the second QCL relationship is indicated by using default QCL information, wherein the default QCL information is at least one of:
- one of pieces of QCL information configured for at least one of a control-resource set or a PDSCH in the second BWP;
- QCL information of a synchronization signal/physical broadcast channel block (SSB) used for initial access;

QCL information used to receive a broadcast PDCCH; or

QCL information of an SSB with a smallest index in SSBs comprised in the second BWP.

16. A communications apparatus, comprising:
a transmitter;
at least one processor; and
one or more memories coupled to the at least one processor and storing programming instructions for execution by the at least one processor to:
   determine a first bandwidth part (BWP) and a second BWP;
   determine an association relationship between the first BWP and the second BWP, wherein the association relationship satisfies that the first BWP and the second BWP each include a same control resource set (CORESET); and
   at least one of:
      determine a first quasi co-location (QCL) relationship between a reference signal of the first BWP and a reference signal of the second BWP based on the association relationship, wherein the transmitter to send a physical downlink shared channel (PDSCH) in the second BWP based on the first QCL relationship; or
      determine a second QCL relationship between a reference signal of the first BWP and a reference signal of the second BWP based on the association relationship, wherein the transmitter to send a physical downlink control channel (PDCCH) in the second BWP based on the second QCL relationship.

17. The communications apparatus according to claim 16, wherein the programming instructions are for execution by the at least one processor to:
   determine that the first QCL relationship is indicated by using QCL information comprised in downlink control information (DCI), wherein the DCI further comprises BWP switching indication information, and wherein the BWP switching indication information is used to indicate a terminal to switch from the first BWP to the second BWP.

18. The communications apparatus according to claim 16, wherein the programming instructions are for execution by the at least one processor to:
   determine that at least one of the first QCL relationship or the second QCL relationship is indicated by using default QCL information, wherein the default QCL information is at least one of:
      QCL information of a control-resource set with a smallest index or identifier in control-resource sets comprised in the first BWP or the second BWP;
      QCL information of a control-resource set comprised in both the first BWP and the second BWP;
      QCL information of a control-resource set comprised in the first BWP in a frequency domain resource on which the first BWP and the second BWP overlap;
      first QCL information in QCL information configured for at least one of a control-resource set or a PDSCH in the first BWP, wherein a reference signal indicated by using the first QCL information is located in the second BWP; or
      second QCL information in QCL information configured for at least one of a control-resource set or a PDSCH in the second BWP, wherein a reference signal indicated by using the second QCL information is located in the first BWP.

19. The communications apparatus according to claim 16, wherein the programming instructions are for execution by the at least one processor to:
   determine that the first QCL relationship is indicated by using default QCL information, wherein the default QCL information is QCL information of a control-resource set on which DCI for scheduling the PDSCH is located.

20. The communications apparatus according to claim 16, wherein the programming instructions are for execution by the at least one processor to:
   determine at least one of that the first QCL relationship or the second QCL relationship is indicated by using default QCL information, wherein the default QCL information is at least one of:
      one of pieces of QCL information configured for at least one of a control-resource set or a PDSCH in the second BWP;
      QCL information of a synchronization signal/physical broadcast channel block (SSB) used for initial access;
      QCL information used to receive a broadcast PDCCH; or
      QCL information of an SSB with a smallest index in SSBs comprised in the second BWP.

* * * * *

UNITED STATES PATENT AND TRADEMARK OFFICE
CERTIFICATE OF CORRECTION

| | |
|---|---|
| PATENT NO. | : 11,569,949 B2 |
| APPLICATION NO. | : 17/100444 |
| DATED | : January 31, 2023 |
| INVENTOR(S) | : Di Zhang and Jianqin Liu |

It is certified that error appears in the above-identified patent and that said Letters Patent is hereby corrected as shown below:

In the Claims

In Column 65, Line 32, in Claim 9, delete "to any one of" and insert -- to --.

In Column 67, Line 23, in Claim 16, before "to send" insert -- is configured --.

In Column 67, Line 29, in Claim 16, after "transmitter" insert -- is configured --.

Signed and Sealed this
Twenty-fifth Day of April, 2023

Katherine Kelly Vidal
*Director of the United States Patent and Trademark Office*